(12) United States Patent
Komatsu et al.

(10) Patent No.: US 9,787,964 B2
(45) Date of Patent: Oct. 10, 2017

(54) INFORMATION PROCESSING DEVICE, INFORMATION PROCESSING METHOD, AND PROGRAM

(71) Applicant: SONY CORPORATION, Tokyo (JP)

(72) Inventors: Koji Komatsu, Tokyo (JP); Nozomu Endo, Tokyo (JP)

(73) Assignee: SONY CORPORATION, Tokyo (JP)

( * ) Notice: Subject to any disclaimer, the term of this patent is extended or adjusted under 35 U.S.C. 154(b) by 224 days.

(21) Appl. No.: 13/900,342

(22) Filed: May 22, 2013

(65) Prior Publication Data

US 2013/0322840 A1 Dec. 5, 2013

(30) Foreign Application Priority Data

Jun. 1, 2012 (JP) ................................ 2012-126348

(51) Int. Cl.
| | |
|---|---|
| H04N 5/77 | (2006.01) |
| H04N 9/79 | (2006.01) |
| H04N 21/4627 | (2011.01) |
| H04N 21/8355 | (2011.01) |
| H04N 21/84 | (2011.01) |
| H04N 21/8543 | (2011.01) |
| H04N 21/44 | (2011.01) |
| H04N 5/765 | (2006.01) |
| H04N 9/82 | (2006.01) |

(52) U.S. Cl.
CPC .............. *H04N 9/79* (2013.01); *H04N 5/772* (2013.01); *H04N 21/44008* (2013.01); *H04N 21/4627* (2013.01); *H04N 21/8355* (2013.01); *H04N 21/84* (2013.01); *H04N 21/8543* (2013.01); *H04N 5/765* (2013.01); *H04N 9/8205* (2013.01)

(58) Field of Classification Search
CPC ............. H04N 5/772; H04N 21/44008; H04N 21/4627; H04N 21/8355; H04N 21/84; H04N 21/8543
USPC .......................................... 386/227, 226, 228
See application file for complete search history.

(56) References Cited

U.S. PATENT DOCUMENTS

| | | | | |
|---|---|---|---|---|
| 4,253,753 | A * | 3/1981 | Takahashi | ...................... 396/318 |
| 5,812,049 | A * | 9/1998 | Uzi | ............................ 340/323 R |
| 6,546,188 | B1 * | 4/2003 | Ishii et al. | ...................... 386/280 |
| 2006/0280496 | A1 * | 12/2006 | Tanoue | ............... H04N 1/00129 396/287 |
| 2008/0055408 | A1 * | 3/2008 | Wun | .............................. 348/122 |
| 2008/0126366 | A1 * | 5/2008 | Malik et al. | ................... 707/100 |

(Continued)

FOREIGN PATENT DOCUMENTS

| | | |
|---|---|---|
| JP | 2007-249516 A | 9/2007 |
| JP | 2009-213013 A | 9/2009 |
| JP | 2011-008422 A | 1/2011 |

OTHER PUBLICATIONS

Japanese Office Action issued on Sep. 29, 2015 in patent application No. 2012126348.

(Continued)

*Primary Examiner* — Helen Shibru
(74) *Attorney, Agent, or Firm* — Chip Law Group

(57) ABSTRACT

There is provided an information processing device including an acquisition unit that acquires incidental information, and a control unit that associates the incidental information with content, until a state is turned into a state in which a predetermined condition is satisfied after the acquisition of the incidental information.

22 Claims, 21 Drawing Sheets

(56) References Cited

U.S. PATENT DOCUMENTS

| | | | |
|---|---|---|---|
| 2009/0216587 A1* | 8/2009 | Dwivedi | G06F 21/31 |
| | | | 705/7.12 |
| 2009/0225229 A1 | 9/2009 | Kobota | |
| 2009/0322890 A1* | 12/2009 | Bocking et al. | 348/211.2 |
| 2010/0029326 A1* | 2/2010 | Bergstrom et al. | 455/556.1 |
| 2011/0099181 A1* | 4/2011 | Aminian et al. | 707/754 |
| 2012/0087588 A1* | 4/2012 | Carter | 382/190 |
| 2013/0173531 A1* | 7/2013 | Rinearson et al. | 707/608 |
| 2013/0286048 A1* | 10/2013 | Sternitzke | 345/633 |
| 2015/0116498 A1* | 4/2015 | Vartiainen | G05B 19/042 |
| | | | 348/159 |

OTHER PUBLICATIONS

Office Action for CN Patent Application No. 201310196317.2, issued on Jan. 16, 2017, 08 pages of Office Action and 16 pages of English Translation.

* cited by examiner

FIG. 11
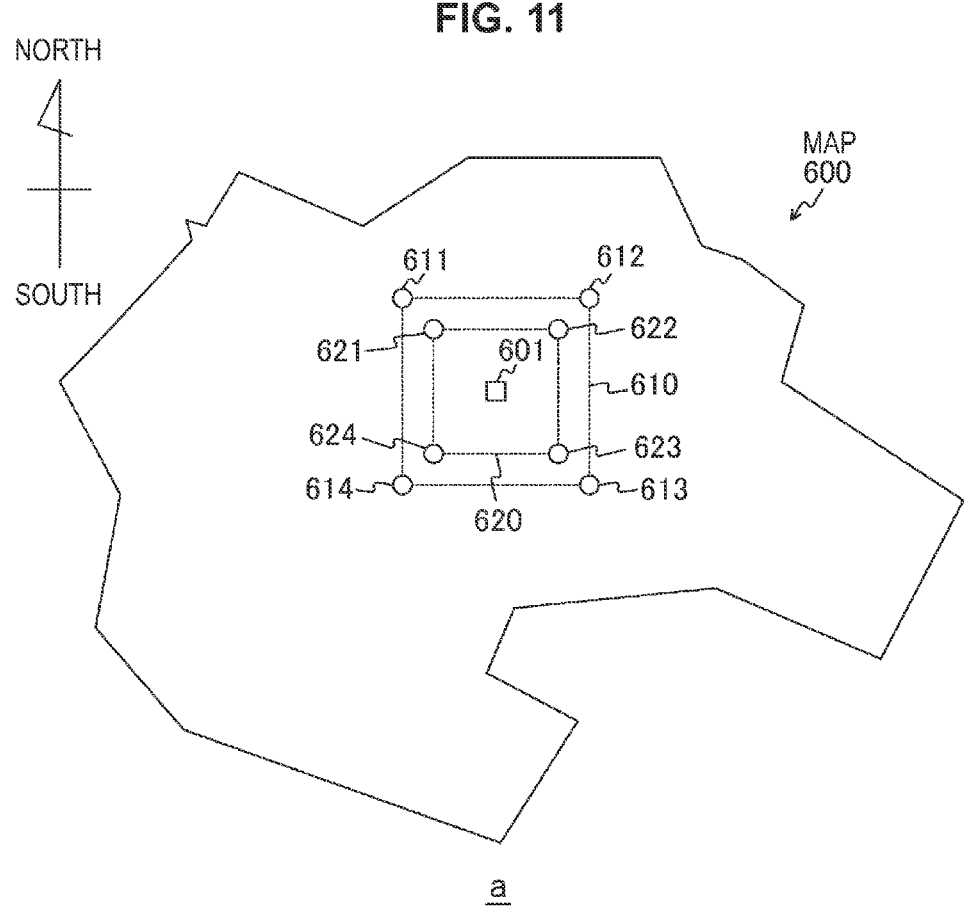
a
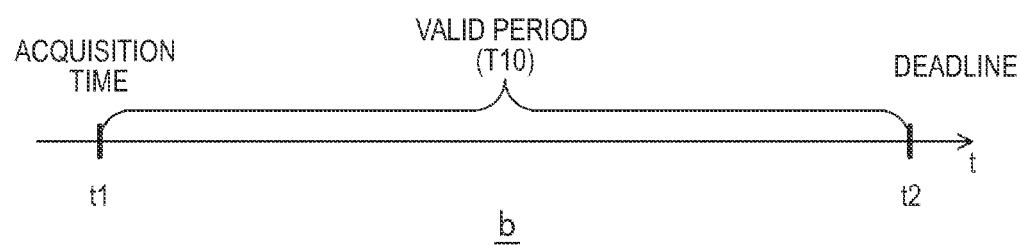
b
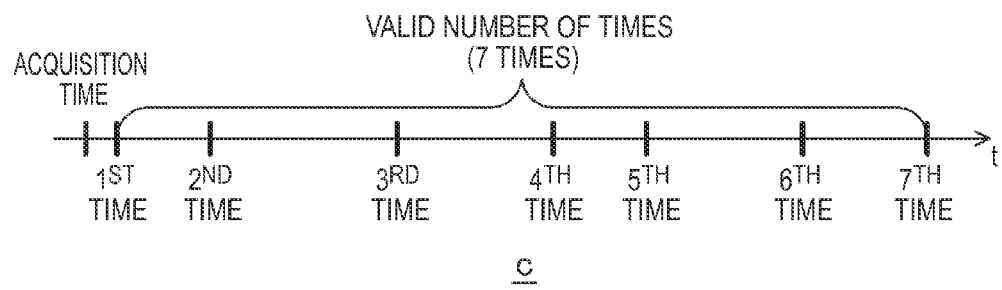
c

INFORMATION PROCESSING DEVICE, INFORMATION PROCESSING METHOD, AND PROGRAM

BACKGROUND

The present technology relates to an information processing device, and more particularly, to an information processing device and an information processing method capable of processing content, and a program causing a computer to perform the information processing method.

In recent years, information processing devices such as digital still cameras and digital video cameras (for example, camera-integrated recorders) that image a subject such as a person or a plant, generate image data, and record the generated image data as image content (image file) have been popularized. For example, an information processing device capable of recording incidental information used, for example, when image content is retrieved in association with image content generated through an imaging process has been suggested.

For example, an image data recording device that records an image when authenticity between a subject and data associated with the subject coincides has been suggested (for example, see Japanese Unexamined Patent Application Publication No. 2007-249516).

SUMMARY

In the above-mentioned related art, an RFID tag in which individual intrinsic tag data is recorded is annexed to a recording target product and a recording worker. By comparing a preset regulation time to a time difference between the time of reading of the tag data recorded in the RFID tag and the time of acquisition of the image data of the recording target product, authenticity of the tag data with respect to working target image data is determined.

However, in the above-mentioned related art, it is necessary to compare the regulation time to the time difference. Further, when the regulation time is not set in advance, the determination of the authenticity may not be performed. Therefore, for example, when the regulation time is changed at each workplace, there is a concern that the setting of the regulation time may become complicated.

It is desirable to provide a technology for associating appropriate incidental information with content.

According to a first embodiment of the present disclosure, there is provided an information processing device, a method thereof and a program to execute the method, the information processing including an acquisition unit that acquires incidental information, and a control unit that associates the incidental information with content, until a state is turned into a state in which a predetermined condition is satisfied after the acquisition of the incidental information. Thus, it is possible to obtain an effect of associating the incidental information with content, until the predetermined condition is satisfied after the acquisition of the incidental information.

According to the first embodiment, the incidental information may have use restriction, the state in which the predetermined condition may be satisfied is a state in which a limit value relevant to the use restriction is exceeded, and when a state is turned into a state in which the predetermined condition is satisfied, the control unit does not associate the incidental information with the content. Thus, it is possible to obtain an effect of not associating the incident information with the content when the limit value relevant to the use restriction is exceeded.

According to the first embodiment, the control unit may perform control of causing a display unit to display information regarding the use restriction. Thus, it is possible to obtain an effect of displaying the information regarding the use restriction.

According to the first embodiment, the use restriction may include time restriction, and the control unit may cause the display unit to display a remaining time relevant to the time restriction. Thus, it is possible to obtain an effect of displaying the remaining time relevant to the time restriction when the use restriction includes the time restriction.

According to the first embodiment, the use restriction may include space restriction, and the control unit may cause the display unit to display a range on a map relevant to the space restriction and a position of the information processing device on the map. Thus, it is possible to obtain an effect of displaying the range on the map relevant to the space restriction and the position of the information processing device on the map when the use restriction includes the space restriction.

According to the first embodiment, the use restriction may include space restriction, and the control unit may cause the display unit to display a distance from a position of the information processing device to a boundary of a range on a map relevant to the space restriction. Thus, it is possible to obtain an effect of displaying the distance from the position of the information processing device to the boundary of the range on the map relevant to the space restriction when the use restriction includes the space restriction.

According to the first embodiment, the use restriction may include space restriction, and the control unit may cause the display unit to display a necessary time which is taken to reach a boundary of a range on a map relevant to the space restriction and which is obtained based on a distance from a position of the information processing device to the boundary of the range and a movement speed of the information processing device. Thus, it is possible to obtain an effect of displaying the necessary time which is taken to reach the boundary of the range on the map relevant to the space restriction and which is obtained based on the distance from a position of the information processing device to the boundary of the range and the movement speed of the information processing device, when the use restriction includes the space restriction.

According to the first embodiment, the use restriction may include number-of-times restriction, and the control unit may cause the display unit to display a remaining value relevant to the number-of-times restriction. Thus, it is possible to obtain an effect of displaying the remaining value relevant to the number-of-times restriction when the use restriction includes the number-of-times restriction.

According to the first embodiment, the content may be image data. When the image data is still image data, the number-of-times restriction may be a number of acquisitions, and when the image data is moving image data, the number-of-times restriction may be a length of the moving image data. Thus, it is possible to obtain an effect of displaying the remaining value relevant to the number of acquisitions when the image data is still image data, and displaying the remaining value relevant to the length of the moving image data when the image data is moving image data.

According to the first embodiment, when the limit value relevant to the use restriction is not exceeded and a notification threshold value relevant to the use restriction is exceeded, the control unit may perform control of causing the display unit to display a fact that a state is near to the state in which the predetermined condition is satisfied. Thus, it is possible to obtain an effect of displaying the fact that the predetermined condition is nearly satisfied when the limit value relevant to the use restriction is not exceeded and a notification threshold value relevant to the use restriction is exceeded.

According to the first embodiment, when the acquisition unit acquires a plurality of pieces of the incidental information, the control unit may cause the display unit to display information regarding the plurality of pieces of acquired incidental information and associate incidental information selected from the plurality of pieces of displayed incidental information through a user's operation with the content. Thus, it is possible to obtain an effect of displaying the display information regarding the plurality of pieces of acquired incidental information when the plurality of pieces of incidental information are acquired, and associating the incidental information selected from the plurality of pieces of displayed incidental information through the user's operation with the content.

According to the first embodiment, the information processing device may further include a content generation unit that generates the content. The acquisition unit may acquire the incidental information including information regarding a generation place of the content. Thus, it is possible to obtain an effect of acquiring the incidental information including the information regarding a generation place of the content.

According to the first embodiment, the acquisition unit may acquire, as the information regarding the generation place of the content, the incidental information that includes at least one of time information regarding an event occurring in the generation place, position information regarding the event, and character information regarding the event. Thus, it is possible to obtain an effect of acquiring the incidental information that includes at least one of the time information regarding the event occurring in the generation place, the position information regarding the event, and the character information regarding the event.

According to the first embodiment, the acquisition unit may generate the incidental information based on multi-dimensional code information acquired by an imaging unit. Thus, it is possible to obtain an effect of generating the incidental information based on the multi-dimensional code information acquired by the imaging unit.

According to the first embodiment, the acquisition unit may acquire the incidental information using wireless communication. Thus, it is possible to obtain an effect of acquiring the incidental information using the wireless communication.

According to the first embodiment, the control unit may perform control of transmitting the content with which the incidental information is associated to another information processing device via a predetermined network. Thus, it is possible to obtain an effect of transmitting the content with which the incidental information is associated to the other information processing device via the predetermined network.

According to the embodiments of the present technology, it is possible to obtain the advantage of associating appropriate incidental information with content.

BRIEF DESCRIPTION OF THE DRAWINGS

FIGS. 11a to 11c are diagrams illustrating an example of use restriction in the incidental information retained in an information processing device 100 according to a second embodiment of the present technology;

DETAILED DESCRIPTION OF THE EMBODIMENTS

Figure 1:
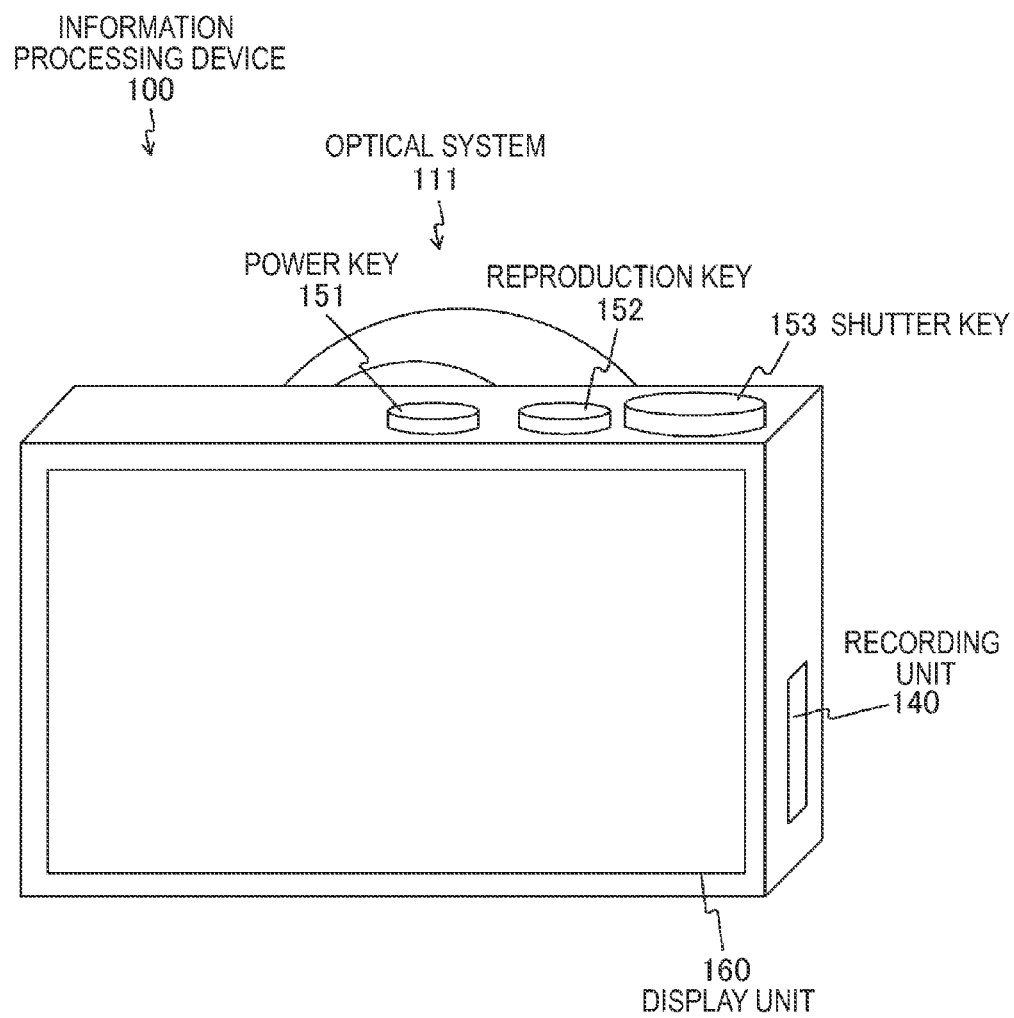
FIG. 1 is a perspective view illustrating an example of the outer appearance configuration of an information processing device 100 according to a first embodiment of the present technology.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, modes (hereinafter referred to as embodiments) for carrying out the present technology will be described. The description thereof will be made in the following order.

1. First Embodiment (Incidental Information Association Control: Example in Which Incidental Information Acquired Using QR Code (Registered Trademark) Is Associated with Content)

2. Second Embodiment (Incidental Information Association Control: Example in Which Incidental Information Acquired Using Wireless Communication Is Associated with Content)

1. First Embodiment

[Example of Outer Appearance of Imaging System]

FIG. 1 is a perspective view illustrating an example of the outer appearance configuration of an information processing device 100 according to a first embodiment of the present technology.

The information processing device 100 includes an optical system 111, a recording unit 140, a power key 151, a reproduction key 152, a shutter key 153, and a display unit 160. For example, the information processing device 100 is realized by an imaging device such as a digital still camera that images a subject, generates image data (image), and records the generated image data as image content (still image content or moving image content).

The optical system 111 is an optical system that obtains incident light from a subject and includes a plurality of lenses.

The power key 151 is an operation member that is used to switch between ON and OFF of the power of the information processing device 100.

The reproduction key 152 is an operation member that is used to set a reproduction mode. For example, when an imaging mode is set, the reproduction mode (a mode for displaying an image recorded in the recording unit 140) is set by operating the reproduction key 152.

The shutter key 153 is an operation member that is used to perform a shutter operation. A user performs a full-push operation or a half-push operation. For example, when the shutter key 153 is pushed halfway, a process (for example, an auto-focus process) corresponding to the imaging mode is performed. Further, when the shutter key 153 is fully pushed, image data imaged at the time of the full push is recorded in the recording unit 140.

[Example of Internal Configuration of Information Processing Device]

Figure 2:
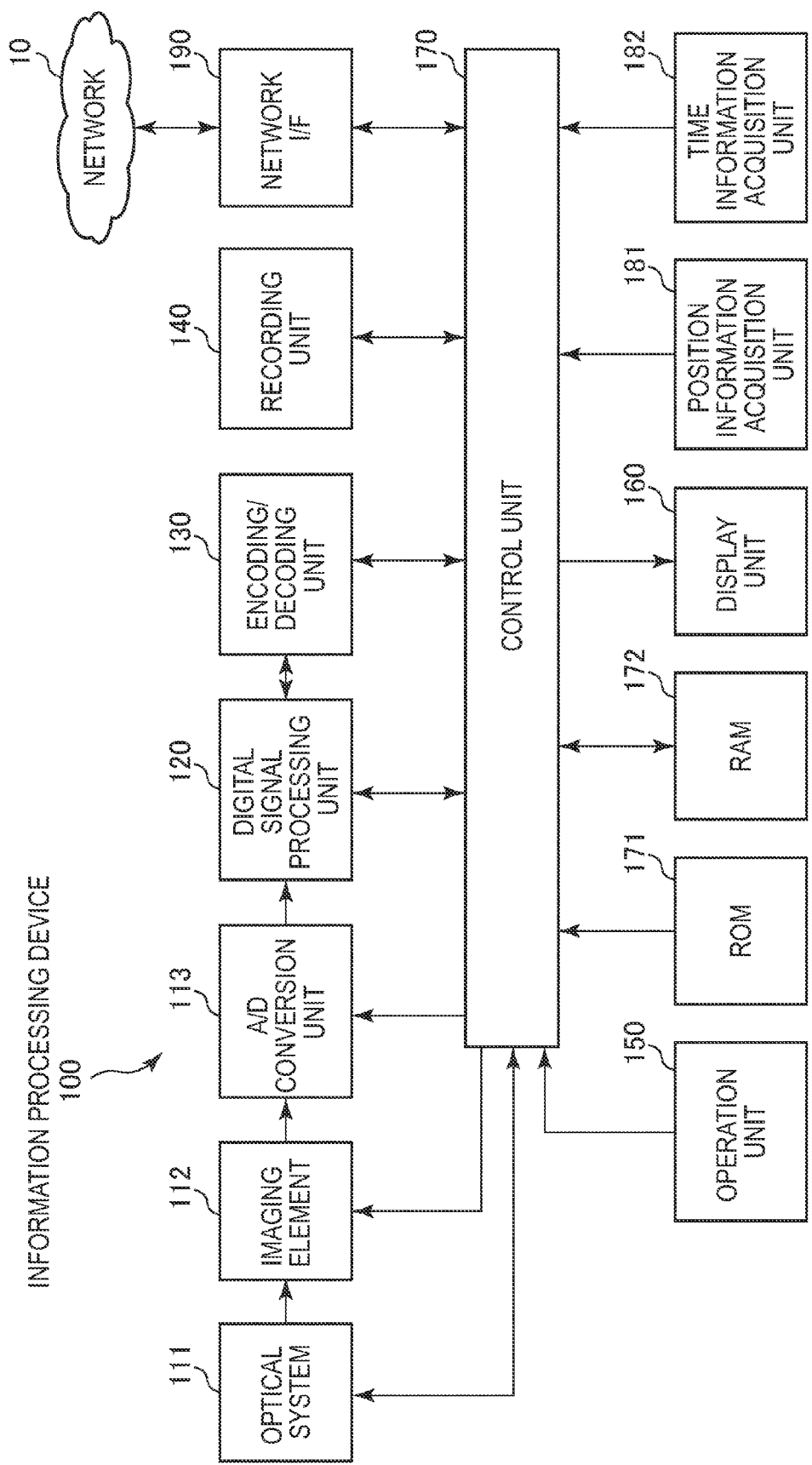
FIG. 2 is a block diagram illustrating an example of the internal configuration of the information processing device 100 according to the first embodiment of the present technology.

FIG. 2 is a block diagram illustrating an example of the internal configuration of the information processing device 100 according to the first embodiment of the present technology.

The information processing device 100 includes the optical system 111, an imaging element 112, an A/D (Analog/Digital) conversion unit 113, a digital signal processing unit 120, an encoding/decoding unit 130, and the recording unit 140. The information processing device 100 further includes an operation unit 150, the display unit 160, a control unit 170, a read-only memory (ROM) 171, and a random access memory (RAM) 172. The information processing device 100 further includes a position information acquisition unit 181, a time information acquisition unit 182, and a network interface (I/F) 190.

The optical system 111 obtains incident light from a subject and supplies the incident light to the imaging element 112. Under the control of the control unit 170, the optical system 111 is moved forward or backward with respect to the subject to perform focusing or zooming.

The imaging element 112 is a photoelectric conversion element that receives the incident light supplied from the optical system 111 under the control of the control unit 170 and converts the incident light into an electric signal (image signal). The imaging element 112 supplies the converted electric signal to the A/D conversion unit 113. The image signal (analog signal) generated by the imaging element 112 is subjected to analog processing such as noise removal or amplification by an analog signal processing unit (not illustrated). For example, a charge coupled device (CCD) or a complementary metal oxide semiconductor (CMOS) can be used as the imaging element 112.

The A/D conversion unit 113 is a unit that converts the image signal (analog signal) supplied from the imaging element 112 into a digital signal under the control of the control unit 170, and supplies the converted digital signal (image signal) to the digital signal processing unit 120.

The digital signal processing unit 120 performs image processing such as black-level correction, white balance adjustment, or γ correction on the image signal (digital signal) supplied from the A/D conversion unit 113 under the control of the control unit 170. The digital signal processing unit 120 supplies the image signal (image data) subjected to the image processing to the encoding/decoding unit 130, the recording unit 140, the display unit 160, and the like.

The encoding/decoding unit 130 is a unit that performs a compression encoding process or a decompression decoding process on the image data. For example, the encoding/decoding unit 130 performs the compression encoding process on the image data supplied from the digital signal processing unit 120 at the time of a recording process. Further, the encoding/decoding unit 130 performs the decompression decoding process on the image data recorded in the recording unit 140 at the time of a reproduction process.

The recording unit 140 is a recording medium that stores various kinds of information (still image content or moving image content) under the control of the control unit 170. Further, the recording unit 140 may be included inside the information processing device 100 or may be detachably mounted on the information processing device 100. Various recording media such as a semiconductor memory, an optical recording medium, a magnetic disk, and a hard disk drive (HDD) can be used as the recording unit 140.

The operation unit 150 is an operation reception unit that receives an operation performed by the user and outputs a control signal (operation signal) according to the details of a received operation to the control unit 170.

The display unit 160 is a display panel (for example, a liquid crystal finder) that displays each image under the control of the control unit 170. For example, the display unit 160 displays the image data supplied from the digital signal processing unit 120 as a preview image. For example, a display panel such as a liquid crystal display or an organic electro-luminescence (EL) panel can be used as the display unit 160.

The control unit 170 controls each unit of the information processing device 100. For example, the control unit 170 includes a central processing unit (CPU) that executes a program stored in the ROM 171 and controls each unit of the information processing device 100 based on the program.

The ROM 171 is a non-volatile memory that stores a program executed by the control unit 170 or various kinds of data.

The RAM 172 is a volatile memory that retains data to be temporarily retained when the control unit 170 operates or rewritable data and is used as, for example, a work memory (for example, a work memory 220 illustrated in FIG. 3) when the control unit 170 operates.

The position information acquisition unit 181 acquires position information indicating a position at which the information processing device 100 is located and outputs the acquired position information to the control unit 170. The position information acquisition unit 181 can be realized by a GPS unit that calculates position information based on a GPS signal received by a Global Positioning System (GPS) signal reception antenna (not illustrated). The calculated position information includes individual data regarding the positions of latitude, longitude, height, and the like when the GPS signal is received. Further, a position information acquisition device acquiring position information according to a method of acquiring other position information may be used. For example, a position information acquisition device that derives position information using access point information obtained by a wireless local area network (LAN) present nearby and acquires the position information may be used.

The time information acquisition unit 182 acquires time information including a time and outputs the acquired time information to the control unit 170.

The network I/F 190 is an interface that controls communication with a network 10 such as a wired LAN or a wireless LAN under the control of the control unit 170, and is connected to the network 10. For example, the information processing device 100 can acquire incidental information via the network I/F 190 using wireless communication (for example, short-range wireless communication). Here, the incidental information is information that is recorded in association with image content and is, for example, incidental information 310 illustrated in FIG. 4*b*. An example of acquisition of the incidental information using wireless communication will be described in a second embodiment of the present technology. The control unit 170 and the network I/F 190 are an example of an acquisition unit described in an embodiment of the present technology.

[Example of Functional Configuration of Information Processing Device]

Figure 3:
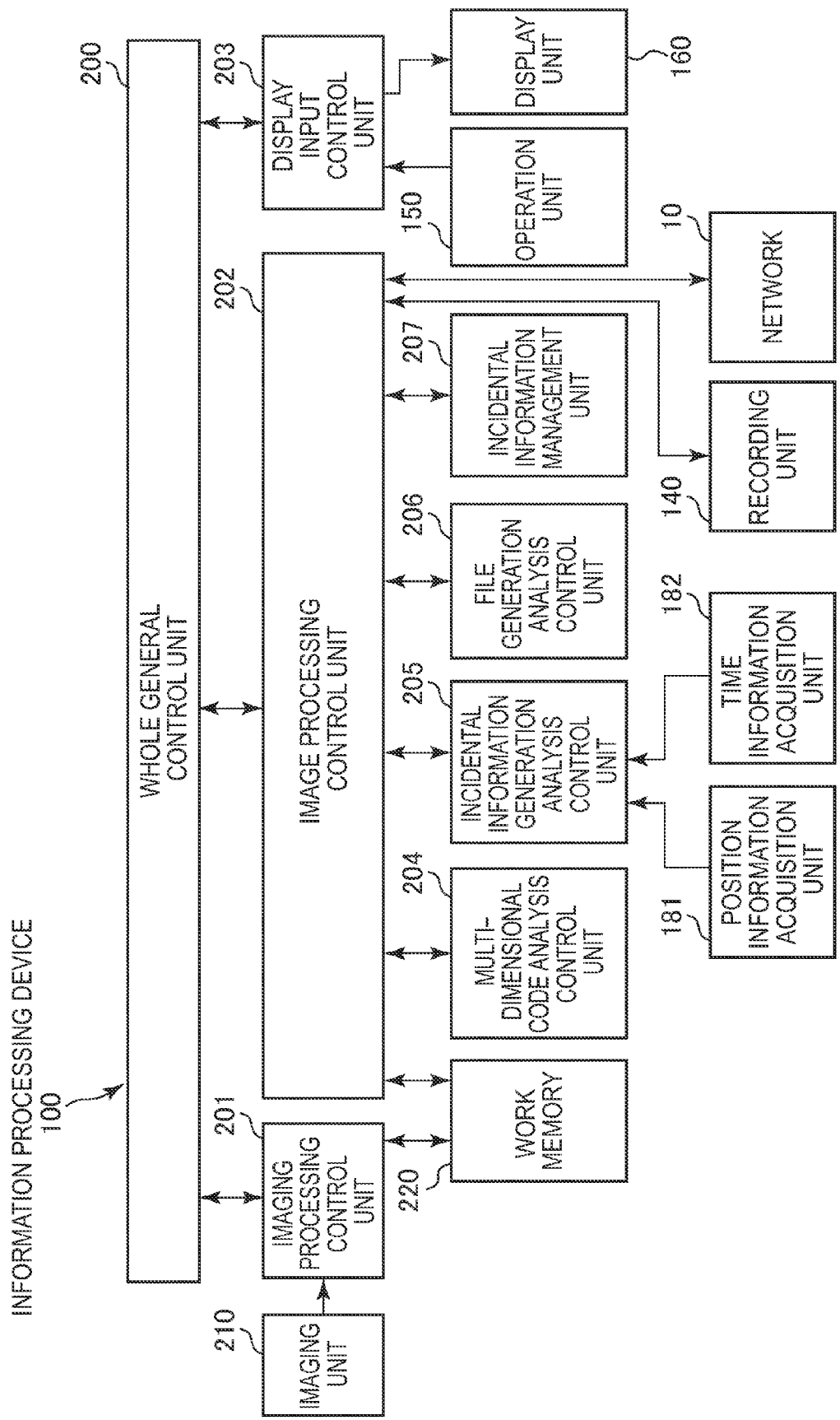
FIG. 3 is a block diagram illustrating an example of a functional configuration of the information processing device 100 according to the first embodiment of the present technology.

FIG. 3 is a block diagram illustrating an example of a functional configuration of the information processing device 100 according to the first embodiment of the present technology.

The information processing device 100 includes a recording unit 140, an operation unit 150, a display unit 160, a position information acquisition unit 181, a time information acquisition unit 182, a whole general control unit 200, an imaging control unit 201, and an image processing control unit 202. The information processing device 100 further includes a display input control unit 203, a multi-dimensional code analysis control unit 204, an incidental information generation analysis control unit 205, a file generation analysis control unit 206, an incidental information management unit 207, an imaging unit 210, and a work memory 220.

The recording unit 140, the operation unit 150, the display unit 160, the position information acquisition unit 181, and the time information acquisition unit 182 correspond to the units with the same names illustrated in FIG. 2. The whole general control unit 200, the imaging control unit 201, the image processing control unit 202, the display input control unit 203, and the multi-dimensional code analysis control unit 204 correspond to the control unit 170 illustrated in FIG. 2. Likewise, the incidental information generation analysis control unit 205, the file generation analysis control unit 206, and the incidental information management unit 207 correspond to the control unit 170 illustrated in FIG. 2. The imaging unit 210 corresponds to the imaging element 112, the A/D conversion unit 113, and the digital signal processing unit 120 illustrated in FIG. 2. The work memory 220 corresponds to the RAM 172 illustrated in FIG. 2.

The whole general control unit 200 generally controls the whole information processing device 100.

The imaging control unit 201 performs each control of the imaging process under the control of the whole general control unit 200. For example, when the imaging control unit 201 receives a photographing operation, the imaging control unit 201 obtains an image (image data) from the imaging unit 210 and retains the image (image data) in the work memory 220.

The image processing control unit 202 performs each control of the image processing under the control of the whole general control unit 200. For example, when the image processing control unit 202 receives a photographing operation, the image processing control unit 202 associates incidental information with the image (image data) and records the image in the recording unit 140.

The display input control unit 203 performs each control of a display process and an input process under the control of the whole general control unit 200. For example, when the user performs an operation, the display input control unit 203 outputs an operation signal indicating that the user performs the operation to the whole general control unit 200. For example, the display input control unit 203 performs a reproduction process of displaying an image on the display unit 160 based on an image file read from the recording unit 140.

The multi-dimensional code analysis control unit 204 analyzes multi-dimensional code information and acquires useful information under the control of the image processing control unit 202. For example, the multi-dimensional code analysis control unit 204 analyzes a QR code of an image (image data) read from the work memory 220 and acquires useful information.

The incidental information generation analysis control unit 205 generates or analyzes the incidental information under the control of the image processing control unit 202. For example, the incidental information generation analysis control unit 205 converts the information (useful information) acquired by the multi-dimensional code analysis control unit 204 into an exchangeable image file format (Exif) tag (Exif information). For example, when the incidental information generation analysis control unit 205 acquires the incidental information (or information used to generate the incidental information) using wireless communication, the incidental information generation analysis control unit 205 converts the incidental information into the Exif tag (Exif information). For example, the incidental information generation analysis control unit 205 checks whether there is the incidental information included in an image file read from the recording unit 140.

The file generation analysis control unit 206 generates or analyzes a file under the control of the image processing control unit 202. For example, the file generation analysis control unit 206 generates a file using the image (image data) received by the imaging control unit 201 and the Exif information. For example, the file generation analysis control unit 206 checks the image file read from the recording unit 140 to determine whether the file data is correct.

The incidental information management unit 207 manages the incidental information retained in the work memory 220 under the control of the whole general control unit 200.

The imaging unit 210 images a subject and generates an image (image data), and then outputs the generated image (image data) to the imaging control unit 201. The imaging unit 210 is an example of a content generation unit described in an embodiment of the present technology. The imaging unit 210, the image processing control unit 202, the multi-dimensional code analysis control unit 204, and the incidental information generation analysis control unit 205 are an example of an acquisition unit described in an embodiment of the present technology.

[Example of Structure of Image File of Still Image]

Figure 4:
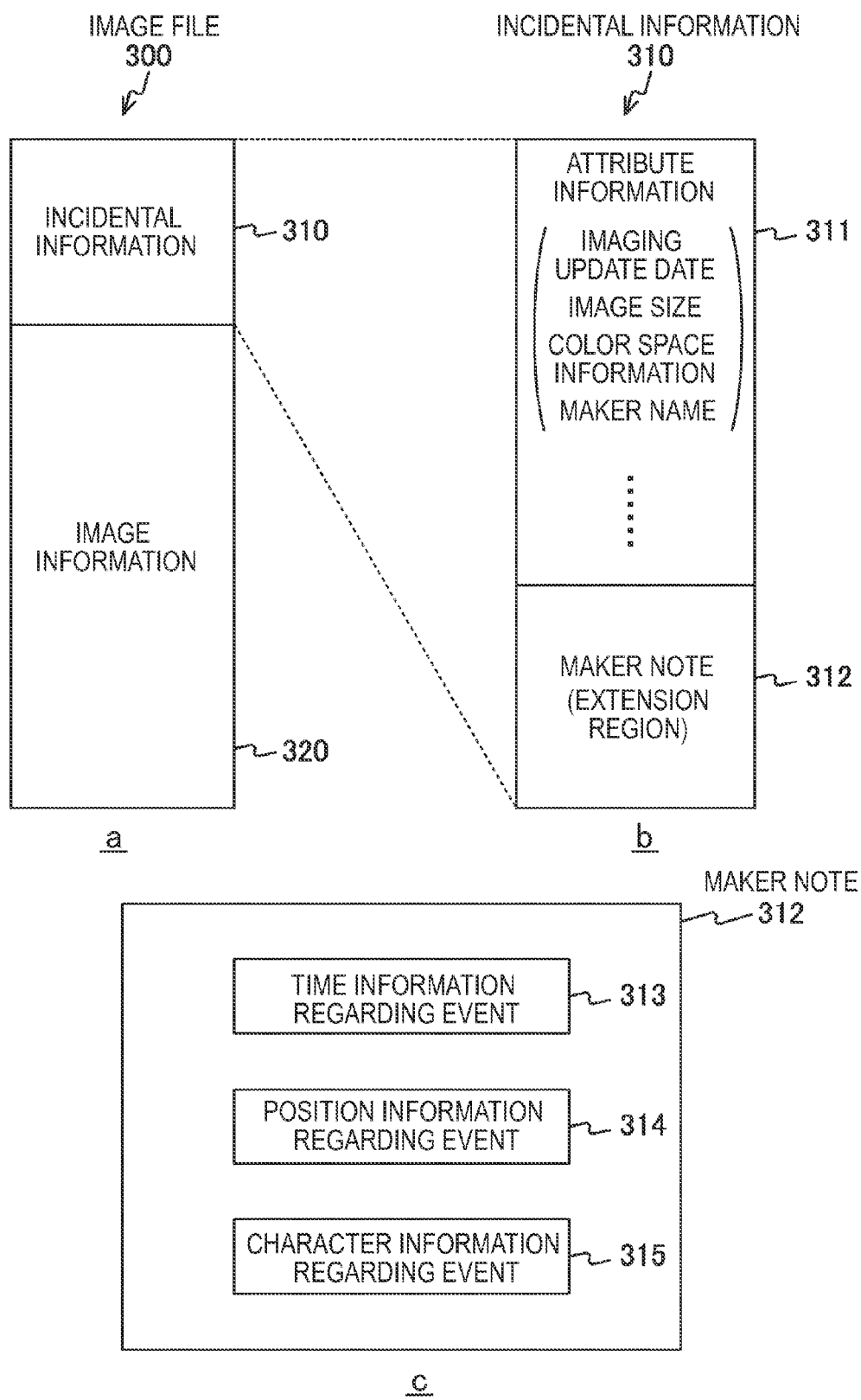
FIGS. 4a to 4c are diagrams illustrating an example of a file structure of an image file recorded in a recording unit 140 according to the first embodiment of the present technology.

FIGS. 4a to 4c are diagrams illustrating an example of a file structure of an image file recorded in the recording unit 140 according to the first embodiment of the present technology.

In the example illustrated in FIGS. 4a to 4c, a file structure of a still image file recorded in conformity to Design rule for Camera File system (DCF) is schematically illustrated. DCF is a file system standard for realizing mutual use of an image between devices such as a digital still camera and a printer via a recording medium. Further, DCF defines a method of naming a file or the structure of a folder when data is recorded on a recording medium based on Exif. Exif is a standard for adding image data and camera information in an image file and defines a format (file format) in which an image file is recorded. FIG. 4a illustrates an example of the structure of an image file 300. FIG. 4b illustrates an example of the structure of incidental information 310. FIG. 4c illustrates an example of the structure of a maker note 312.

The image file 300 is a still image file that is recorded in conformity with the DCF standard and includes the incidental information 310 and the image information 320, as illustrated in FIG. 4a. For example, the image information 320 is image data compressed in the JPEG format by the encoding/decoding unit 130.

The incidental information 310 includes attribute information 311 and a maker note 312, as illustrated in FIG. 4b. The attribute information 311 is attribute information or the like regarding the image file 300. For example, the attribute information 311 includes GPS information, time information, characteristic information (for example, device characteristics) of an imaging unit, a photographing update date, an image size, color space information, and a maker name. For example, imaging location information (for example, TAGID=1000001 to 1000004) such as a latitude or a longitude is included as the GPS information. The incidental information 310 is an example of incidental information described in an embodiment of the present technology.

Figure 5:
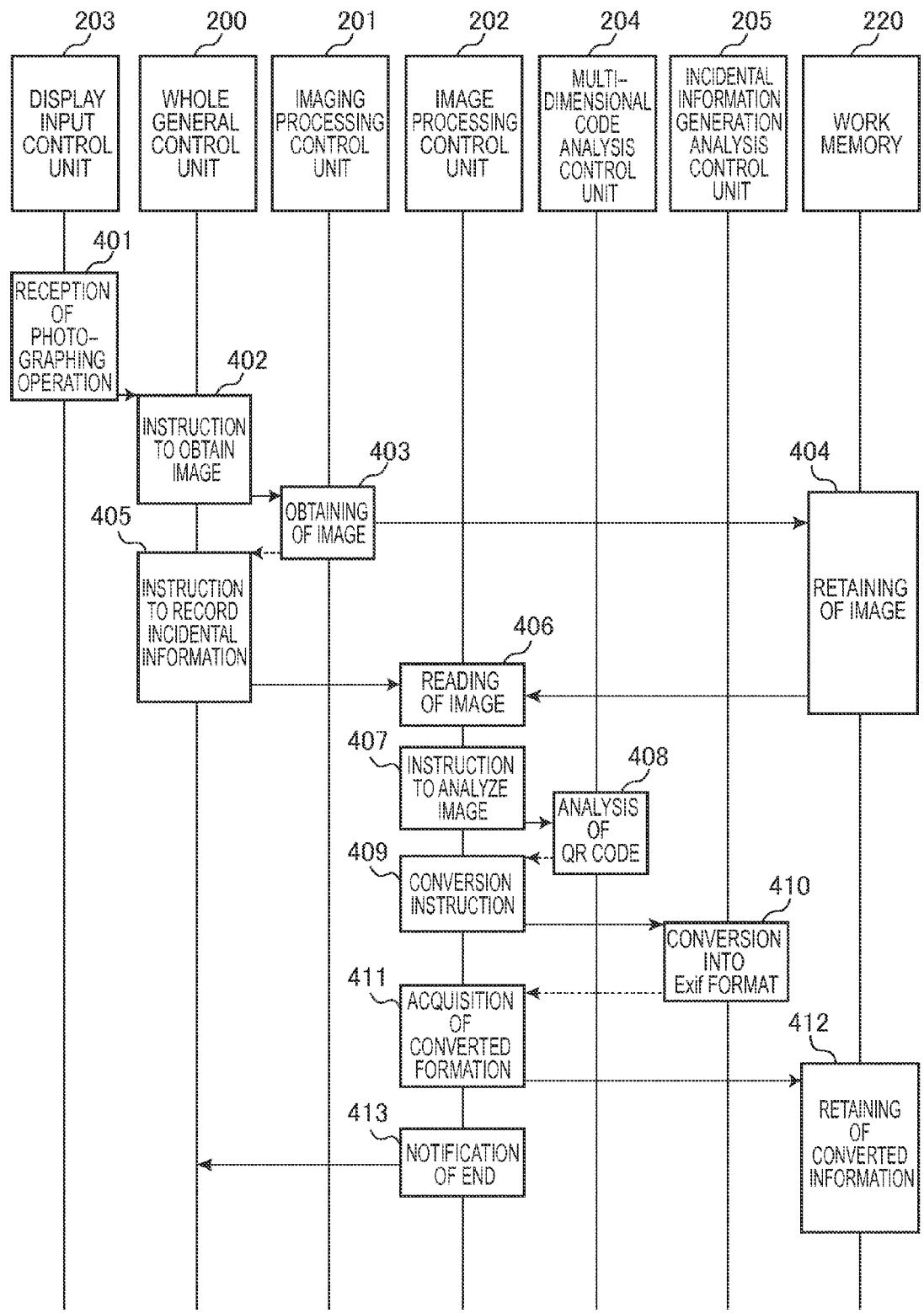
FIG. 5 is a sequence chart illustrating an example of an acquisition process when incidental information is acquired by the information processing device 100 according to the first embodiment of the present technology.

The maker note 312 is generally a region in which user-unique data is recorded and is an extension region (TAGID=37500, MakerNote) in which each maker can freely record information. As illustrated in FIG. 4c, for example, time information 313 regarding an event, position information 314 regarding the event, and character information 315 regarding the event are recorded in the maker note 312. For example, such incident information is acquired by imaging a QR code (Quick Response code), as illustrated in FIG. 5. Here, the event is, for example, an event of a concert, a sports game, or the like. The position information 314 regarding the event is information that is used to specify a location (event place) at which the event occurs and is, for example, a latitude and a longitude. The time information 313 regarding the event is time information that is used to specify a time at which the event occurs and is, for example, a period of time at which the event occurs. The character information 315 regarding the event is character information that is used to specify the event and is, for example, the title of the event and the name of a performer of the event. Other incidental information may be recorded in the maker note 312.

[Example of Acquisition of Incidental Information]

FIG. 5 is a sequence chart illustrating an example of an acquisition process when the incidental information is acquired by the information processing device 100 according to the first embodiment of the present technology. FIG. 5 illustrates the example in which the incidental information is acquired by imaging the QR code by the information processing device 100.

Here, the QR code is a matrix-type 2-dimensional code in which small rectangles (including rectangles arranged at three corners, each rectangle having a structure in which a smaller rectangle is placed at the center of a larger rectangle) are arranged horizontally and vertically according a predetermined rule. By imaging and reading the QR code, various kinds of information (incidental information) according to each rectangle arranged in the QR code can be acquired.

The details acquired from the QR code include, for example, the information (the time information 313 regarding the event, the position information 314 regarding the event, and the character information 315 regarding the event) illustrated in FIG. 4c. The details acquired from the QR code may include an imaging condition (imaging parameter). When the incidental information including the imaging condition (imaging parameter) is acquired, the imaging condition (imaging parameter) is set in the information processing device 100. Further, the details acquired from the QR code may include restriction information used to append use restriction (for example, time restriction, space restriction, or number-of-times restriction) to the incidental information. When the incidental information including the restriction information is acquired, the use restriction is managed in the information processing device 100.

First, the user points the optical system 111 toward the QR code to be imaged, and then fully presses down the shutter key 153. Thus, when the user operates the full-push operation of the shutter key 153, an operation signal indicating an intention (an intention to receive a photographing operation) is detected by the display input control unit 203. The display input control unit 203 outputs the intention to the whole general control unit 200 (401).

When the whole general control unit 200 receives a notification indicating an intention to receive the photographing operation, the whole general control unit 200 gives an instruction to obtain an image to the imaging control unit 201 (402). When the imaging control unit 201 receives the instruction to obtain the image, the imaging control unit 201 obtains the image (image data) generated by the imaging unit 210 (403), retains the image (image data) in the work memory 220 (404), and outputs an image obtaining notification to the whole general control unit 200.

When the whole general control unit 200 receives the image obtaining notification, the whole general control unit 200 instructs the image processing control unit 202 to perform analysis of the QR code and conversion into the Exif tag (405). That is, an instruction to read the incidental information is given (405).

When the image processing control unit 202 receives the instruction to record the incidental information, the image processing control unit 202 reads the image (image data) retained in the work memory 220 (406). Then, the image processing control unit 202 gives an instruction (an instruction to analyze the image) to analyze the QR code to the multi-dimensional code analysis control unit 204 (407). Subsequently, the multi-dimensional code analysis control unit 204 analyzes the QR code on the image (image data) read from the work memory 220, acquires useful information, and outputs the useful information to the image processing control unit 202 (408).

Subsequently, the image processing control unit 202 gives an instruction (conversion instruction) to generate the Exif tag to the incidental information generation analysis control unit 205 (409). Subsequently, the incidental information generation analysis control unit 205 converts the information (useful information) acquired by the multi-dimensional code analysis control unit 204 into the Exif tag (Exif information), and outputs the converted information (converted information) to the image processing control unit 202 (410).

Here, when the information (useful information) acquired by the multi-dimensional code analysis control unit 204 is information defined in conformity with the Exif standard, the incidental information generation analysis control unit 205 converts the information into information with a format in conformity to the Exif standard. Conversely, when the acquired information (useful information) is information (undefined information) which is not defined in conformity with the Exif standard, the incidental information generation analysis control unit 205 converts the information into information which has a unique format and is stored in a region which an individual company can uniquely use. The region which an individual company can uniquely use is, for example, the maker note 312 illustrated in FIGS. 4b and 4c.

The image processing control unit 202 acquires the converted information (Exif information) (411) and temporarily retains the converted information in the work memory 220 (412). When the same Exif information is already present in the work memory 220, the Exif information may be substituted with the newly acquired converted information. Then, the image processing control unit 202 notifies the whole general control unit 200 that the recording of the incidental information ends (413).

[Example of Recording of Image]

Figure 6:
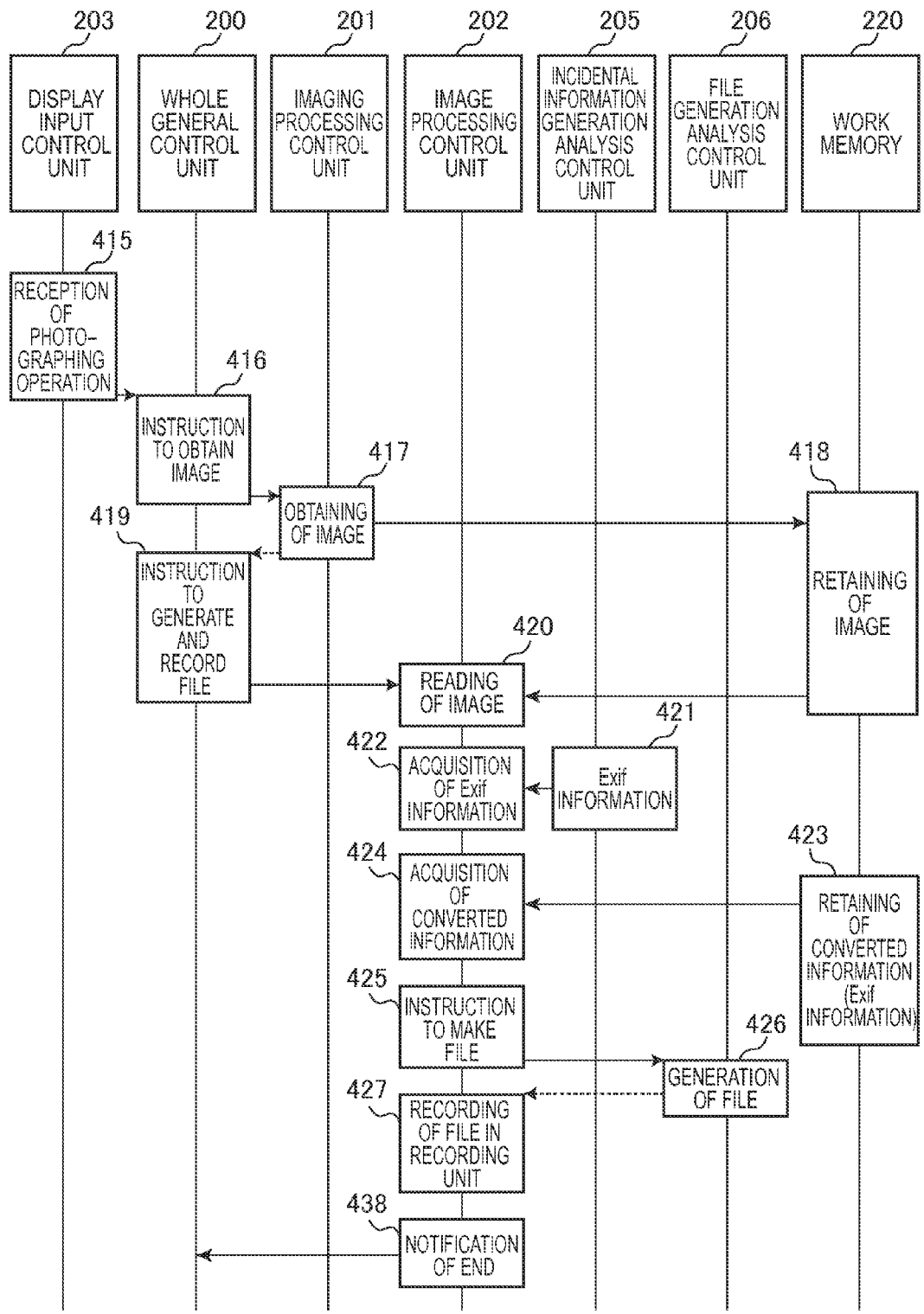
FIG. 6 is a sequence chart illustrating an example of a recording process when an image is recorded by the information processing device 100 according to the first embodiment of the present technology.

FIG. 6 is a sequence chart illustrating an example of a recording process when an image is recorded by the information processing device 100 according to the first embodiment of the present technology. FIG. 6 illustrates the example in which a still image generated by imaging a subject is recorded.

FIG. 6 illustrates a flow of the recording process when the incidental information is retained in the work memory 220 and the user performs a normal imaging process.

First, the user points the optical system 111 toward the subject to be imaged, and then fully presses down the shutter key 153. Thus, when the user operates the full-push operation of the shutter key 153, an operation signal indicating an intention (an intention to receive a photographing operation) is detected by the display input control unit 203. The display input control unit 203 outputs the intention to the whole general control unit 200 (415).

When the whole general control unit 200 receives a notification indicating an intention to receive the photographing operation, the whole general control unit 200 gives an instruction to obtain an image to the imaging control unit 201 (416). When the imaging control unit 201 receives the instruction to obtain the image, the imaging control unit 201 obtains the image (image data) generated by the imaging unit 210 (417), retains the image (image data) in the work memory 220 (418), and outputs an image obtaining notification to the whole general control unit 200.

When the whole general control unit 200 receives the image obtaining notification, the whole general control unit 200 instructs the image processing control unit 202 to file and record the received image (419). That is, an instruction to generate and record the file is given (419).

When the image processing control unit 202 receives the instruction to generate and record the file, the image processing control unit 202 reads the image (image data) retained in the work memory 220 (420). Then, the image processing control unit 202 acquires the Exif information generated by the incidental information generation analysis control unit 205 (421 and 422). The Exif information is information (for example, the attribute information 311 illustrated in FIG. 4b) recorded in the image file. For example, the Exif information includes the position information acquired by the position information acquisition unit 181 and the time information acquired by the time information acquisition unit 182.

Subsequently, the image processing control unit 202 acquires the Exif information (converted information converted from the QR code) (423) retained in the work memory 220 (424). Subsequently, the image processing control unit 202 gives an instruction (an instruction to make a file) to generate an image file to the file generation analysis control unit 206 (425). Subsequently, the file generation analysis control unit 206 generates a file using the image (image data) received by the imaging control unit 201 and the acquired Exif information (426). Here, the acquired Exif information includes the Exif information generated by the incidental information generation analysis control unit 205 and the converted information (Exif information) converted from the QR code.

A case in which the Exif information is not retained in the work memory 220 (when the Exif information converted from the QR code is not present) is also assumed. In this case, the image file is generated using only the Exif information (for example, the position information and the time information) generated by the incidental information generation analysis control unit 205.

Thus, when the image file is generated by the file generation analysis control unit 206, the image processing control unit 202 records the generated image file in the recording unit 140 (427). Subsequently, the image processing control unit 202 notifies the whole general control unit 200 that the recording of the image file ends (428).

[Example of Upload of Image]

Figure 7:
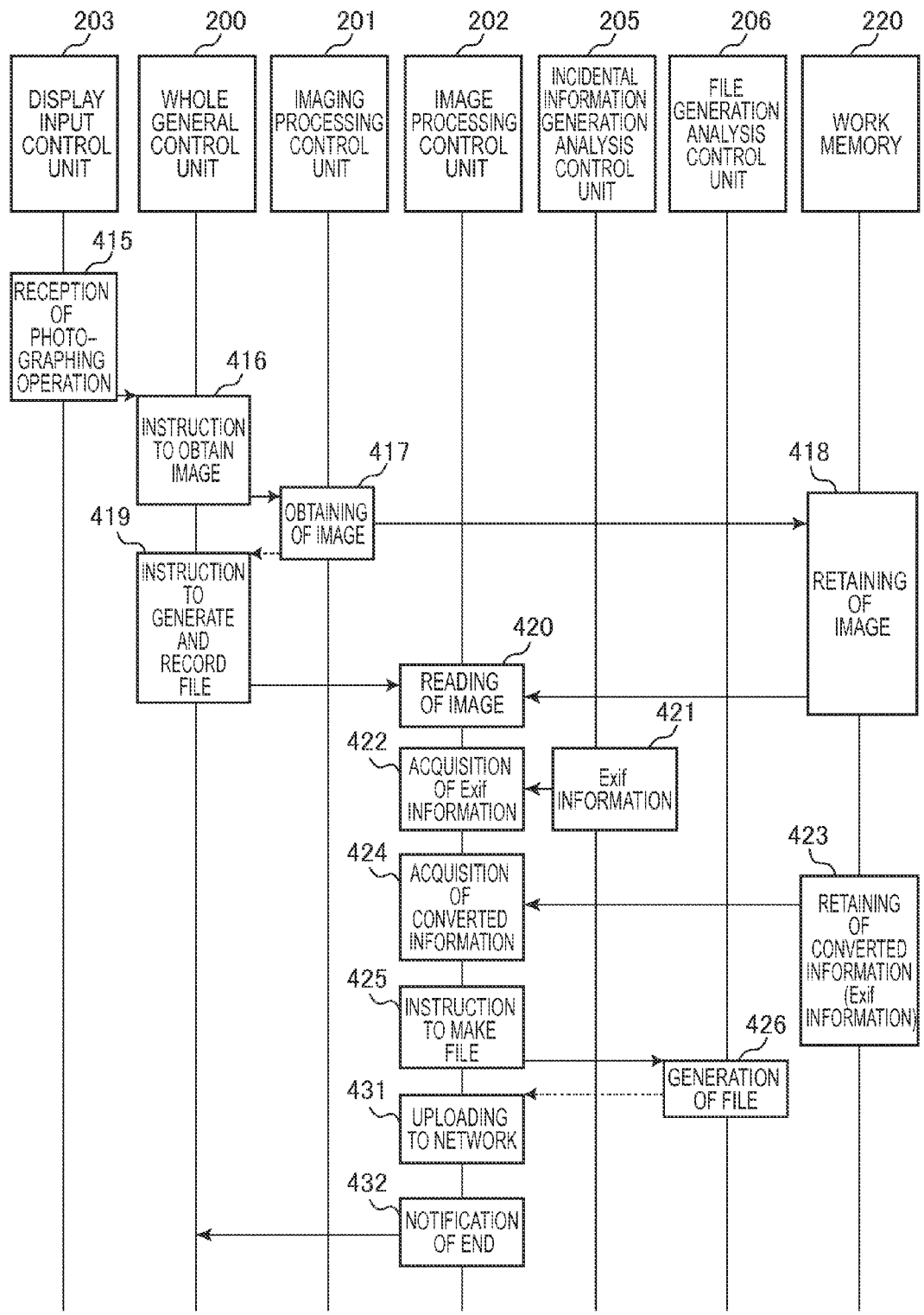
FIG. 7 is a sequence chart illustrating an example of an uploading process when an image is uploaded by the information processing device 100 according to the first embodiment of the present technology.

FIG. 7 is a sequence chart illustrating an example of an uploading process when an image is uploaded by the information processing device 100 according to the first embodiment of the present technology.

FIG. 7 illustrates the example in which a still image generated by imaging a subject is uploaded. The uploading is, for example, uploading of the still image to a social networking service (SNS). FIG. 7 illustrates a flow of the uploading process when the user performs a normal imaging process when the incidental information is retained in the work memory 220.

The sequence chart illustrated in FIG. 7 is a modification example of FIG. 6. Therefore, the same reference numerals are given to portions common to those in FIG. 6, and the description thereof will be partially omitted.

When the file generation analysis control unit 206 generates the image file, the image processing control unit 202 uploads the generated image file to another information processing device (for example, a server) via the network 10 (431). Subsequently, the image processing control unit 202 notifies the whole general control unit 200 that the uploading of the image file ends (432).

[Example of Reproduction of Image]

Figure 8:
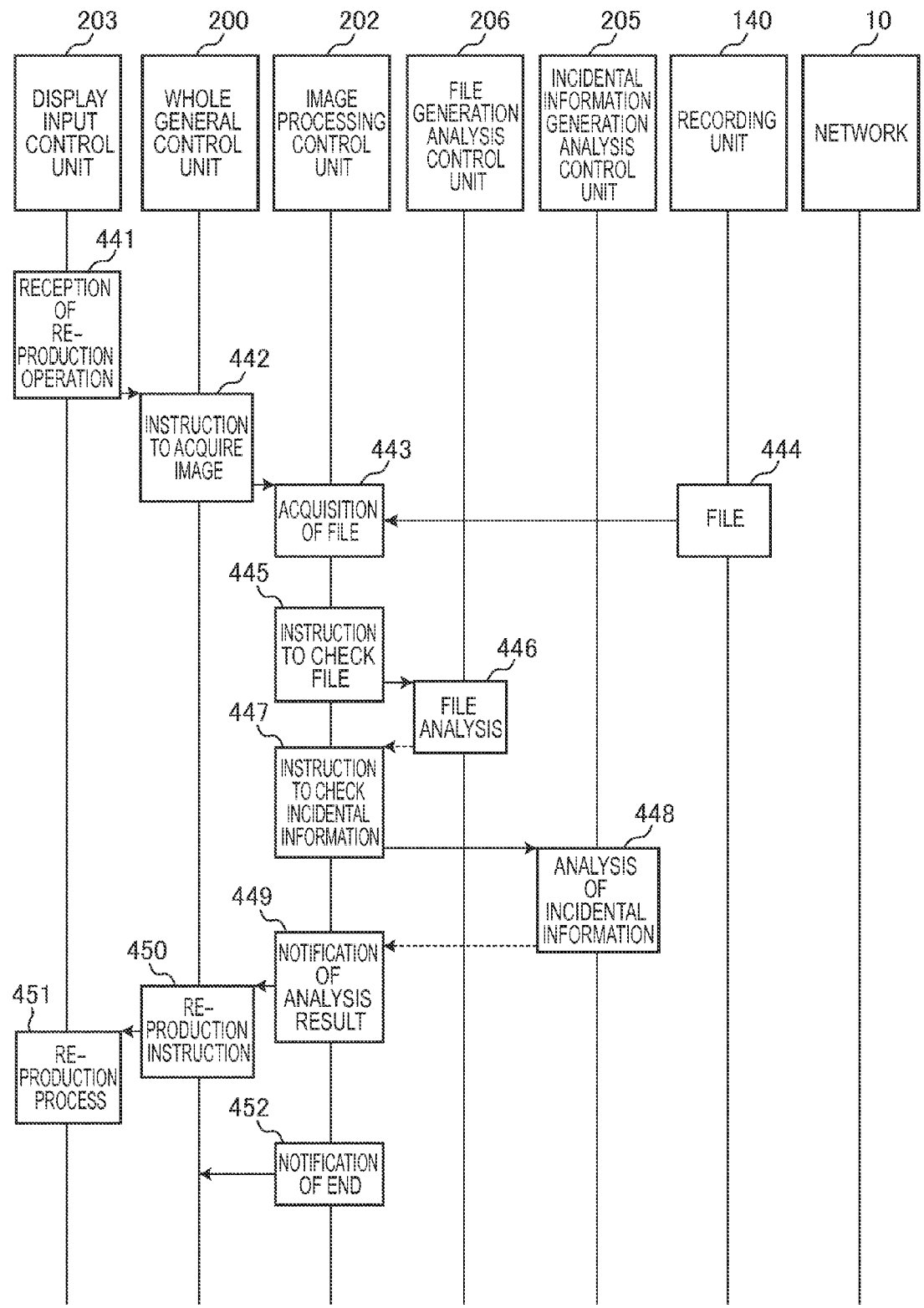
FIG. 8 is a sequence chart illustrating an example of a reproduction process when an image is reproduced by the information processing device 100 according to the first embodiment of the present technology.

FIG. 8 is a sequence chart illustrating an example of a reproduction process when an image is reproduced by the information processing device 100 according to the first embodiment of the present technology. FIG. 8 illustrates the example in which a reproduction mode in which only an image recorded in association with the incidental information is reproduced is set and the image is reproduced.

First, the user presses down the reproduction key 152. Thus, when the operation of pressing down the reproduction key 152 is performed, the display input control unit 203 detects an operation signal indicating the intention (the intention to receive the reproduction operation) (441). Then, the display input control unit 203 outputs the intention to the whole general control unit 200 (442). When the whole general control unit 200 receives the notification indicating the intention to receive the reproduction operation, the whole general control unit 200 sets the reproduction mode in which only the image recorded in association with the incidental information is reproduced.

When the whole general control unit 200 receives a notification indicating an intention to receive the reproduction operation, the whole general control unit 200 gives an instruction to acquire an image recorded in association with the incidental information to the image processing control unit 202. When the image processing control unit 202 receives the instruction to acquire the image, the image processing control unit 202 reads and acquires the file (image file) of the image (444) recorded in association with the incidental information from the recording unit 140 (443).

Subsequently, the image processing control unit 202 gives the file generation analysis control unit 206 an instruction (an instruction to check a file) to perform file analysis of checking whether the data (file data) of the acquired file (image file) is correct (445). Subsequently, the file generation analysis control unit 206 checks the image file acquired by the image processing control unit 202 to check whether the file data is correct (446). That is, the file analysis is performed (446).

When the file data is correct (446), the image processing control unit 202 gives the incidental information generation analysis control unit 205 an instruction (instruction to check the incidental information) to perform incidental information analysis of checking whether the incidental information included in the acquired image file is present (447). Subsequently, the incidental information generation analysis control unit 205 checks whether the incident information included in the image file acquired by the image processing control unit 202 is present (448). That is, the incidental information analysis is performed (448). Then, the incidental information generation analysis control unit 205 outputs the analysis result to the image processing control unit 202 (448).

When the file data is not correct (446), the image processing control unit 202 does not check whether the incident information included in the acquired image file is present and notifies the whole general control unit 200 that it is not checked whether the incident information included in the acquired image file is present. In this case, the whole general control unit 200 does not output the reproduction instruction to the display input control unit 203.

Subsequently, when the incident information is present as the analysis result from the incidental information generation analysis control unit 205, the image processing control unit 202 notifies the whole general control unit 200 of the analysis result (449). When the whole general control unit 200 receives the analysis result, the whole general control unit 200 outputs the reproduction instruction to the display input control unit 203 (450). When the display input control unit 203 receives the reproduction instruction, the display input control unit 203 performs the reproduction process of displaying the image on the display unit 160 based on the image file acquired from the recording unit 140 (451). Thus, the user can confirm the image file recorded in the recording unit 140.

When the plurality of image files are recorded in the recording unit 140, the above-described reproduction process (443 to 451) is performed repeatedly for each image file.

Conversely, when the incidental information is not present as the analysis result from the incidental information generation analysis control unit 205, the image processing control unit 202 notifies the whole general control unit 200 of the analysis result (449). When the whole general control unit 200 receives the analysis result, the whole general control unit 200 does not output the reproduction instruction to the display input control unit 203.

When the reproduction process on all of the image files ends, the image processing control unit 202 notifies the whole general control unit 200 that the reproduction process on all of the image files ends (452).

[Example of Upload of Image]

Figure 9:
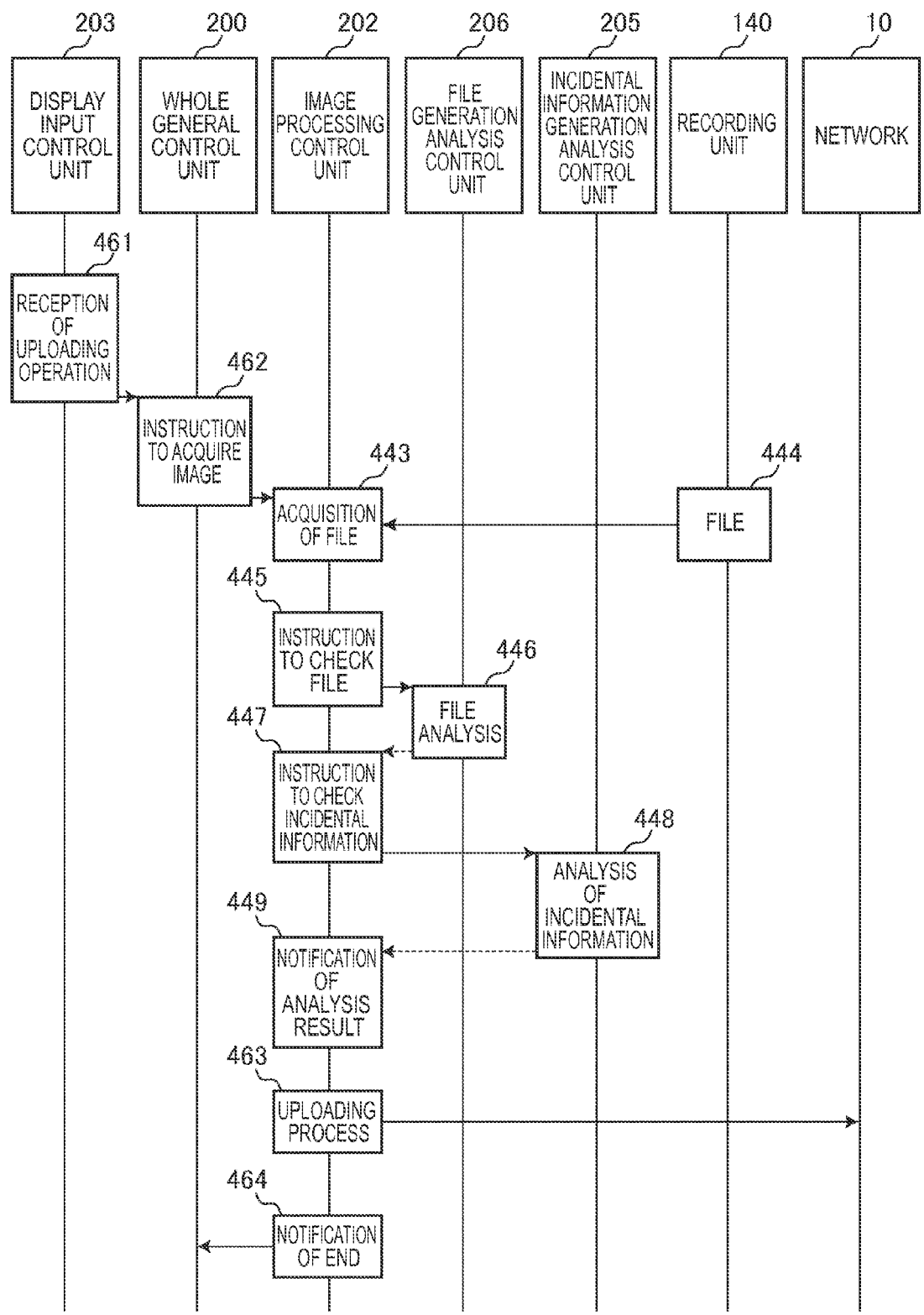
FIG. 9 is a sequence chart illustrating an example of an uploading process when an image is uploaded by the information processing device 100 according to the first embodiment of the present technology.

FIG. 9 is a sequence chart illustrating an example of an uploading process when an image is uploaded by the information processing device 100 according to the first embodiment of the present technology.

FIG. 9 illustrates the example in which the image is uploaded by setting an uploading mode in which only the image recorded in association with the incidental information is uploaded (for example, uploading to an SNS).

The sequence chart illustrated in FIG. 9 is a modification example of FIG. 8. Therefore, the same reference numerals are given to portions common to those in FIG. 8, and the description thereof will be partially omitted.

First, the user performs the uploading operation. Thus, when the user performs the uploading operation, the display input control unit 203 detects an operation signal of an intention (an intention to receive the uploading operation) (461). Then, the display input control unit 203 outputs the intention to the whole general control unit 200 (462). When the whole general control unit 200 receives the notification indicating the intention to receive the uploading operation, the whole general control unit 200 sets the uploading mode in which only the image recorded in association with the incidental information is uploaded.

When the incidental information is present as the analysis result from the incidental information generation analysis control unit 205, the image processing control unit 202 performs the uploading process of uploading the image file acquired from the recording unit 140 (463). Thus, the user can easily upload the image file recorded in the recording unit 140.

When the plurality of image files are recorded in the recording unit 140, the above-described reproduction process (443 to 449 and 463) is performed repeatedly for each image file.

When the file data of the image file is not correct or the incident information is not present as the analysis result from the incidental information generation analysis control unit 205, the image processing control unit 202 does not perform the uploading process.

When the reproduction process on all of the image files ends, the image processing control unit 202 notifies the whole general control unit 200 that the uploading process on all of the image files ends (464).

[Example of Process of Information Processing Device]

Figure 10:
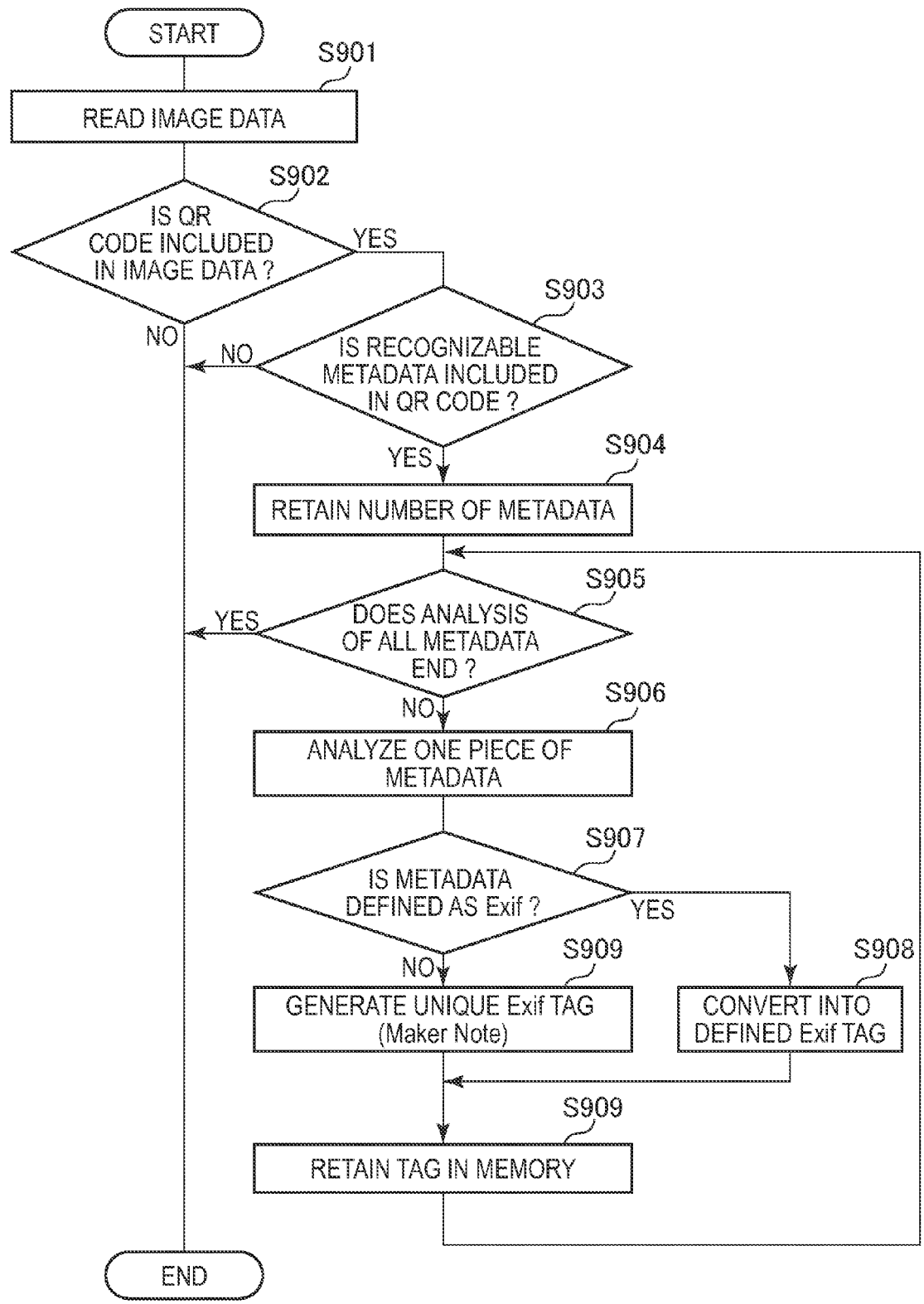
FIG. 10 is a flowchart illustrating an example of the processing procedure of an incidental information generation process performed by the information processing device 100 according to the first embodiment of the present technology.

FIG. 10 is a flowchart illustrating an example of the processing procedure of an incidental information generation process performed by the information processing device 100 according to the first embodiment of the present technology. The processing procedure corresponds to the processes (406 to 412) illustrated in FIG. 5. That is, the processing procedure is an example of the processing procedure when the multi-dimensional code information is converted into the Exif information.

First, the image processing control unit 202 reads the image data (image) retained in the work memory 220 (step S901). Subsequently, the multi-dimensional code analysis control unit 204 determines whether the QR code is included in the image data (step S902). When the QR code is not included in the image data, the incidental information generation process ends. Conversely, when the QR code is included in the image data (step S902), the multi-dimensional code analysis control unit 204 determines whether recognizable metadata (useful information) is included in the QR code (step S903). When the recognizable metadata is not included in the QR code (step S903), the incidental information generation process ends.

When the recognizable metadata is included in the QR code (step S903), the multi-dimensional code analysis control unit 204 retains the number of recognizable metadata (step S904). Subsequently, the multi-dimensional code analysis control unit 204 determines whether analysis of the number of retained metadata ends (step S905). When the analysis of the metadata corresponding to the retained number ends, the incidental information generation process ends.

When the analysis of the metadata corresponding to the retained number does not end (step S905), the multi-dimensional code analysis control unit 204 selects one piece of the unanalyzed metadata and analyzes the selected metadata (step S906). When the metadata is metadata defined in conformity with the Exif standard as the analysis result (step S907), the incidental information generation analysis control unit 205 converts the metadata into the Exif tag (Exif information) defined in conformity with the Exif standard (step S908). Conversely, when the metadata is not metadata defined in conformity with the Exif standard as the analysis result (step S907), the incidental information generation analysis control unit 205 generates a unique Exif tag (Exif information) using the metadata (step S909).

Subsequently, the image processing control unit 202 retains the tag in the work memory 220 (step S910) and the process returns to step S905.

Thus, the control unit 170 (for example, the image processing control unit 202, the multi-dimensional code analysis control unit 204, and the incidental information generation analysis control unit 205) acquires the incidental information. For example, the control unit 170 acquires the incidental information including information regarding a generation place of the image content. For example, the information regarding the generation place of the image content is at least one of the time information regarding an event occurring at the generation place, the position information regarding the event, and the character information regarding the event.

For example, the control unit 170 can generate the incidental information based on the multi-dimensional code information acquired by the imaging unit 210. For example, the control unit 170 can acquire the incidental information using wireless communication.

The control unit 170 performs control of associating the incidental information with the image content until the predetermined condition is satisfied after the acquisition of the incidental information. The state in which the predetermined condition is satisfied means, for example, a case in which a deletion operation can be received or a case in which a limit value (for example, a limit time) relevant to the use restriction is exceeded.

The control unit 170 performs control of recording the image content associated with the incidental information in the recording unit 140. The control unit 170 performs control of transmitting the image content associated with the incidental information to another information processing device via the network 10.

In recent years, digital still cameras or smartphones have been popularized, and thus the capacities of recording media have increased. Therefore, many users photograph a large volume of still images, moving images, or the like. Thus, an improvement in retrieval is assumed, for example, by embedding tags as incidental information (additional information) in images in order to find only images desired by a user among a large volume of images at a high speed.

However, when the user manually sets the tag information, it takes some time in a case in which images are abundant.

Since social networking services (SNSs) have been widely popularized, opportunities to share images among a plurality of users have increased. For example, the images can be shared by uploading the images photographed by the users themselves to a cloud service or the like. However, when the images are uploaded, it is necessary to embed tag information in an image file in order to improve the retrieval.

However, since the tag information is not embedded in the image file, for example, the user himself or herself should manually input the tag information when uploading an image. Therefore, when the user manually sets the tag information, it takes some time, for example, in a case in which the user desires to upload an image directly from the outside.

Accordingly, in the first embodiment of the present technology, the tag information can be easily retained in the information processing device 100, since the tag information is embedded in the multi-dimensional code information and the user photographs the multi-dimensional code information using the information processing device 100. Then, the tag information can be automatically embedded in all of the subsequently generated image files. Since reliability of the incidental information itself can be improved by embedding a valid period or a physical valid range of the incidental information in the multi-dimensional code information, the tag information can be utilized more usefully. This example will be described in a second embodiment of the present technology.

Thus, in the first embodiment of the present technology, for example, by performing an operation for the association in advance only once, the incidental information can be automatically added to an image photographed after the operation for the association. Therefore, a user's operation of adding the incidental information can be omitted. The operation for the association itself is not a user's operation of inputting characters but a spontaneous action of photographing for treatment of a photographing device, and thus the user can perform the operation casually and easily. The user is relieved of the burden of the user's manual input of the embedding of the tag information.

Since a user's operation for the association is only the photographing, the incidental information itself is automatically input in a system. Therefore, the user does not erroneously input the incidental information. Further, since the incidental information itself is defined identically, it is possible to prevent information (for example, information mostly similar but subtly different) individually input by users from being recorded as the incidental information. Thus, it is possible to prevent the accuracy at the time of retrieval from deteriorating.

Since the incidental information is not recorded on an image in an overlapping manner and is recorded in a dedicated incidental information region (for example, a region used to record the incidental information 310 illustrated in FIG. 4b), the use amount of a memory can be reduced. When images are browsed, the images themselves are not displayed in the overlapping manner. Compatibility between kinds of devices can be secured because of the conformity with the common format of Exif.

Specifically, for example, a host part can prepare multi-dimensional code information in which the tag information is embedded in a reception of an event place, tickets, or the like. Then, visitors visiting the event can photograph the multi-dimensional code information and can upload and register images of the event to a cloud, an SNS, or the like, so that visibility of the event itself can be improved. Further, since the tag information of the same character string can be used, the retrieval can be considerably improved.

In the first embodiment of the present technology, the example in which the incidental information is acquired using the QR code has been described. However, the incidental information may be acquired using other multi-dimensional code information such as a 2-dimensional code or a 3-dimensional code. Further, the incidental information may be acquired using code information such as a barcode. Furthermore, the incidental information may be acquired using wireless communication such as a wireless LAN (for example, WiFi) or Bluetooth (registered trademark).

In the first embodiment of the present technology, the example in which the incidental information is associated with the still image has been described. However, even when the incidental information is recorded in association with a moving image, the first embodiment of the present technology can be applied. In this case, the incidental information is recorded in a recording region of the incidental information in a moving image file.

2. Second Embodiment

In the first embodiment of the present technology, the example in which the incidental information acquired by photographing the multi-dimensional code information is used has been described. Here, for example, an event such as a concert or the Olympic Games in which a period or a place is restricted is assumed. When content (a still image or a moving image) is recorded at the event, incidental information corresponding to the event is assumed to be used only during the period of the event. Therefore, since use restriction is appended to the incidental information corresponding to the event, the incidental information corresponding to the event can be validated only within a range in which the user desires to use the incidental information.

Accordingly, in a second embodiment of the present technology, a use example of the incidental information to which the use restriction is appended will be described. The configuration of an information processing device according to the second embodiment of the present technology is substantially the same as the configuration in the example illustrated in FIGS. 1 to 3. Therefore, the same reference numerals are given to the units common to those according to the first embodiment of the present technology, and the description thereof will be partially omitted.

As described above, the information processing device 100 can acquire incidental information using wireless communication. Thus, in the second embodiment of the present technology, an example in which the incidental information to which the use restriction is appended is acquired and used using wireless communication (for example, short-range wireless communication) will be described.

Here, for example, wireless communication such as near field communication (NFC), a wireless LAN (for example, WiFi), Bluetooth, an infrared ray, or a portable radio wave can be used as the wireless communication. The above-described incidental information can be received via the network I/F 190 by the wireless communication. For example, in the event place, the incidental information transmitted regularly or irregularly by the wireless communication by a server can be received via the network I/F 190. Thus, when the information processing device 100 acquires the incidental information to which the use restriction is appended using the wireless communication, the information processing device 100 may automatically set use start and use end of the acquired incidental information.

[Example of Use Restriction]

FIGS. 11a to 11c are diagrams illustrating an example of the use restriction in the incidental information retained in the information processing device 100 according to the second embodiment of the present technology.

FIG. 11a illustrates an example in which space restriction is appended as the use restriction. For example, on a map 600, a current position 601 of the information processing device 100 is indicated by a white rectangle and a valid range 610 is indicated by a dotted line. The valid range 610 is specified by latitudes and longitudes corresponding to four corners (indicated by white circles) 611 to 614 of the dotted line rectangle.

In the example illustrated in FIG. 11a, the incidental information (the incidental information retained in the information processing device 100) corresponding to the valid range 610 can be used when the current position 601 of the information processing device 100 is within the valid range 610. On the other hand, when the current position 601 of the information processing device 100 is outside of the valid range 610, the incidental information (the incidental information retained in the information processing device 100) corresponding to the valid range 610 may not be used. Thus, when the current position 601 of the information processing device 100 is outside of the valid range 610, the incidental information (the incidental information retained in the information processing device 100) corresponding to the valid range 610 may be set to be deleted or may be set to be temporarily unusable.

Figure 14:
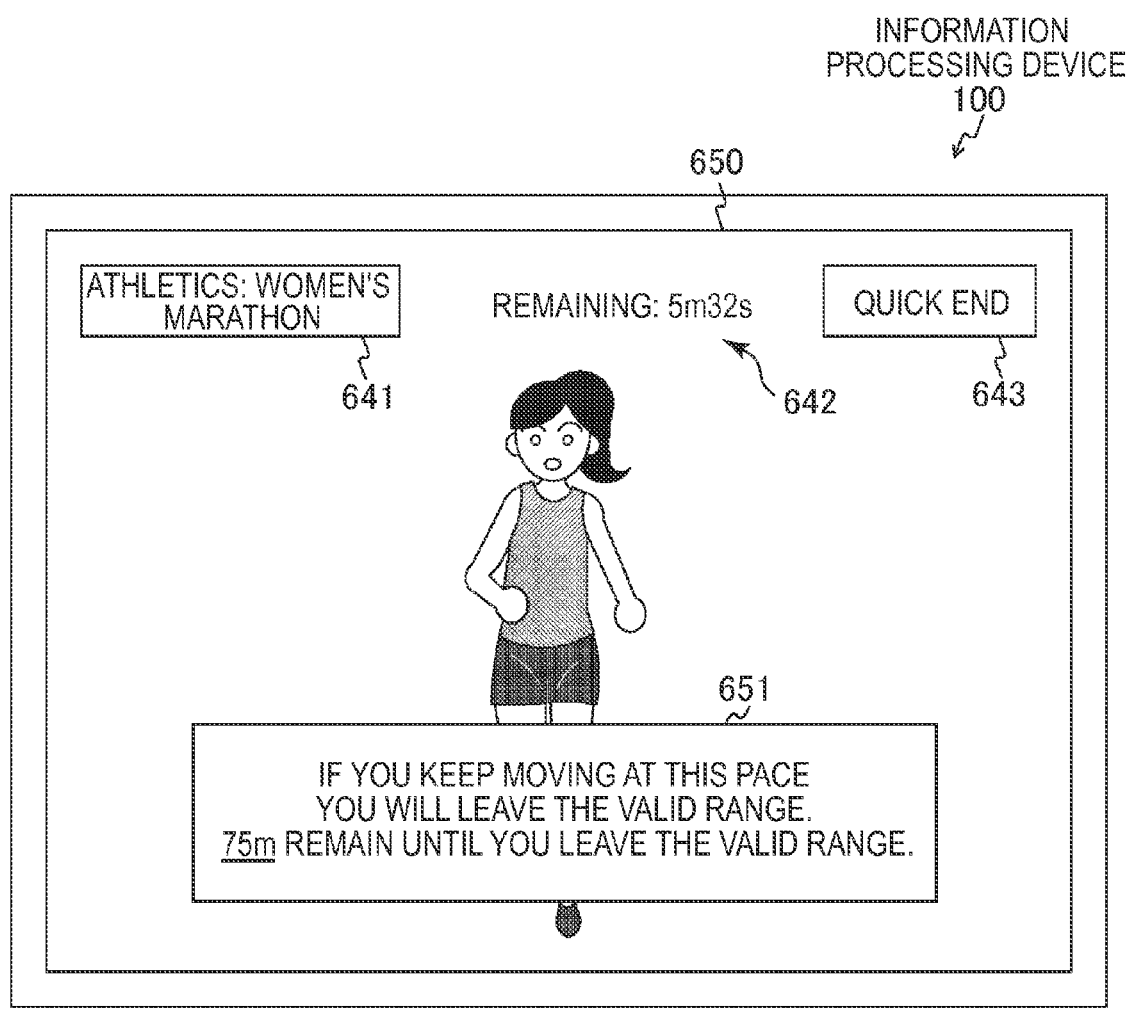
FIG. 14 is a diagram illustrating an example of a display screen displayed in an imaging process using the information processing device 100 according to the second embodiment of the present technology.
Figure 15:
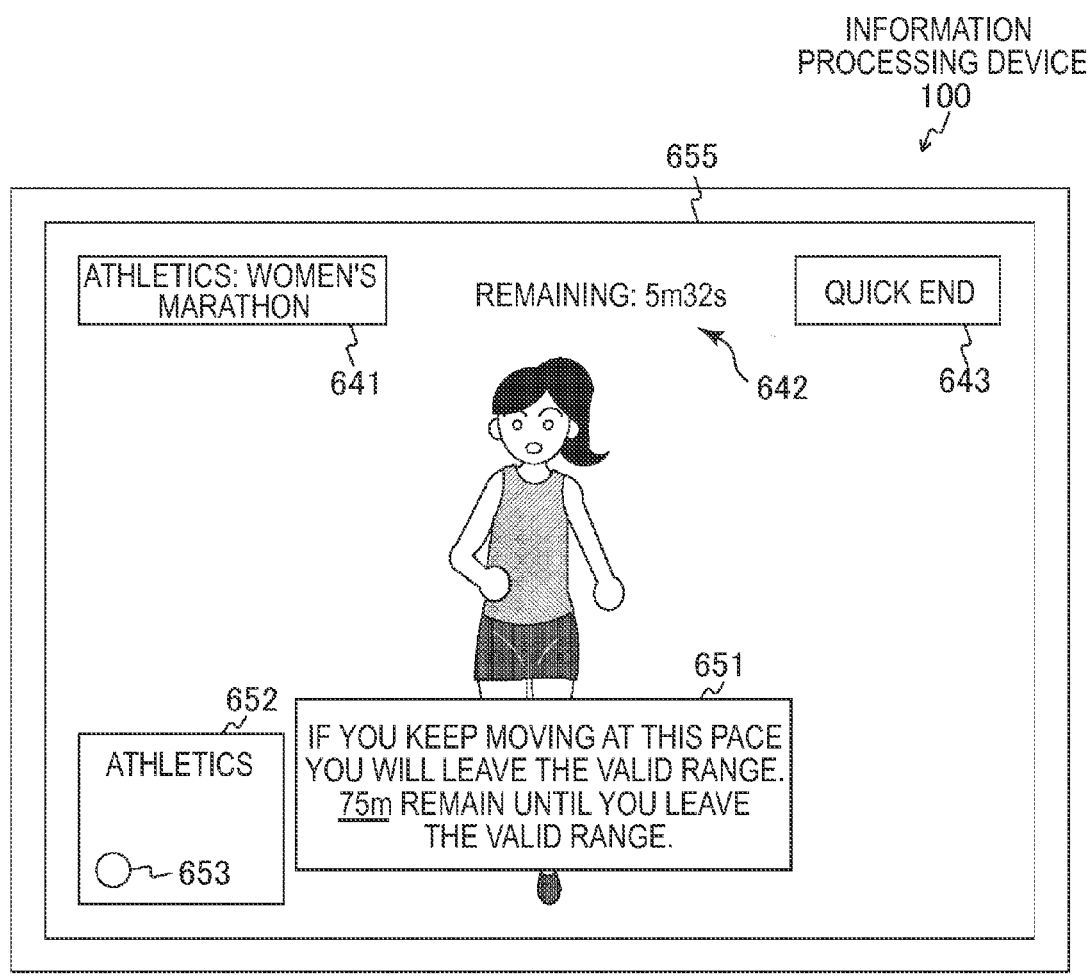
FIG. 15 is a diagram illustrating an example of a display screen displayed in the imaging process using the information processing device 100 according to the second embodiment of the present technology.

The current position 601 of the information processing device 100 is within the valid range 610. However, when the current position 601 of the information processing device 100 leaves the valid range 610, the user may be notified that the current position 601 of the information processing device 100 has left the valid range 610. For example, when the current position 601 of the information processing device 100 is within the valid range 610 but is located out of a warning notification range 620, the user may be notified that the current position 601 of the information processing device 100 is within the valid range 610 but is located outside of the warning notification range 620. The warning notification range 620 is specified by latitudes and longitudes corresponding to four corners (indicated by white circles) 621 to 624 of the dotted line rectangle. For example, the user can be notified through audio output or message display of the fact that the warning notification range 620 is specified by the latitudes and longitudes. This example is illustrated in FIGS. 14 and 15.

The shortest distance between the current position 601 of the information processing device 100 and the outer circumference of the valid range 610 may be calculated and the user may be notified of the shortest distance (for example, display or audio is output). This example is illustrated in FIGS. 14 and 15.

FIG. 11b illustrates an example in which the time restriction is appended as the use restriction. For example, a valid period is set to T10, an acquisition time of the incidental information corresponding to the valid period T10 is set to t1, and a time point at which the valid period T10 passes from the acquisition time t1 is set to a deadline t2.

In the example illustrated in FIG. 11b, within the valid period T10, the incidental information (the incidental information retained in the information processing device 100) corresponding to the valid period T10 can be used. On the other hand, when the valid period T10 has passed (a time reaches the deadline t2), the incidental information (the incidental information retained in the information processing device 100) corresponding to the valid period T10 may not be used. Thus, when the valid period T10 has passed, the incidental information (the incidental information retained in the information processing device 100) corresponding to the valid period T10 may be set to be deleted or may be set to be temporarily unusable.

Figure 13:
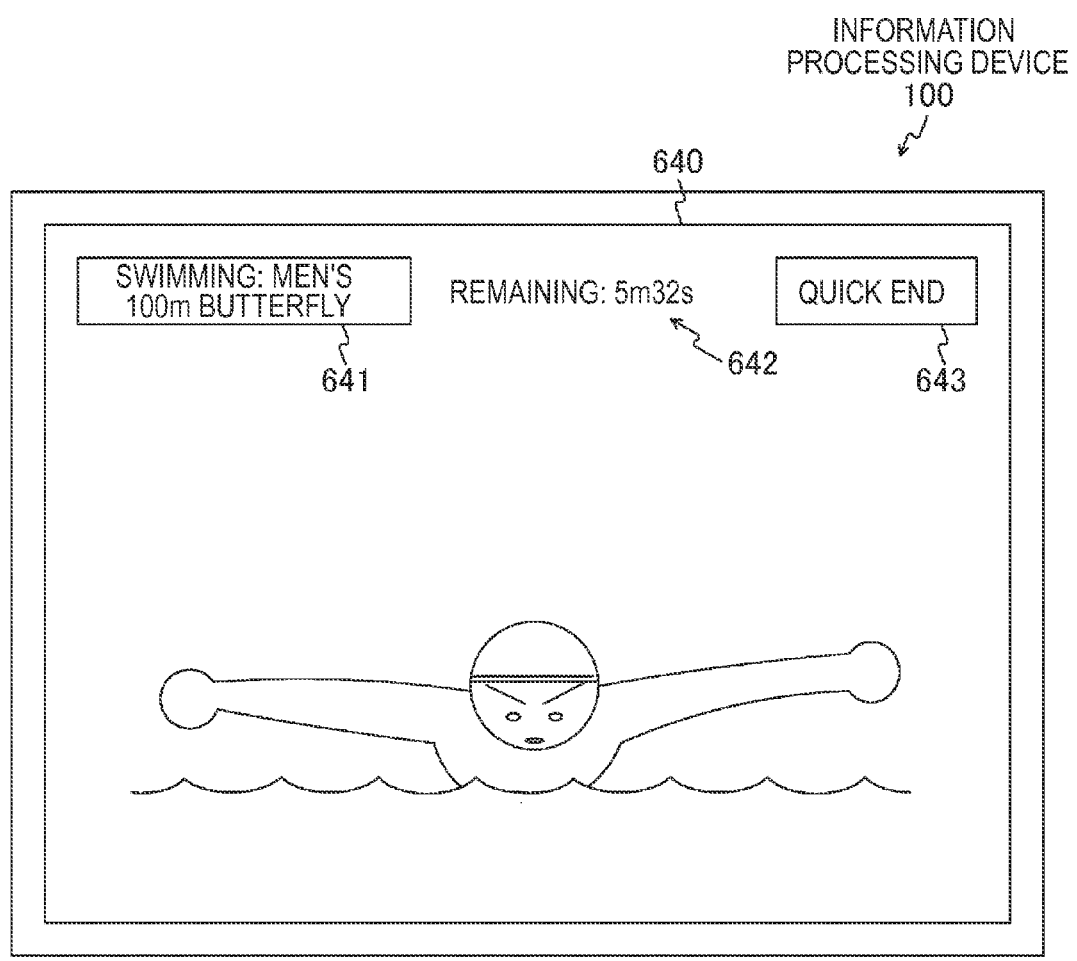
FIG. 13 is a diagram illustrating an example of a display screen displayed in an imaging process using the information processing device 100 according to the second embodiment of the present technology.

When the information processing device 100 acquires the incidental information corresponding to the valid period T10, a remaining time of the valid period T10 may be displayed based on the elapsed time from the acquisition time t1. This example is illustrated in FIG. 13 and the like. When a time reaches a predetermined timing (for example, 1 hour before the deadline t2), the user may be notified that the usable time of the incidental information draws near (for example, display or audio is output).

FIG. 11c illustrates an example in which restriction on the number of uses is appended as the use restriction. For example, the valid number of times is set to 7 times.

In the example illustrated in FIG. 11c, within the range of the valid number of times (7 times), the incidental information (the incidental information retained in the information processing device 100) corresponding to the valid number of times (7 times) can be used. On the other hand, when the incidental information is used only the valid number of time (7 times), the incidental information (the incidental information retained in the information processing device 100) corresponding to the valid number of times (7 times) may no longer be used. Thus, when the incidental information is used only the valid number of times (7 times), the incidental information (the incidental information retained in the information processing device 100) corresponding to the valid number of times (7 times) may be set to be deleted or may be set to be temporarily unusable.

Figure 16:
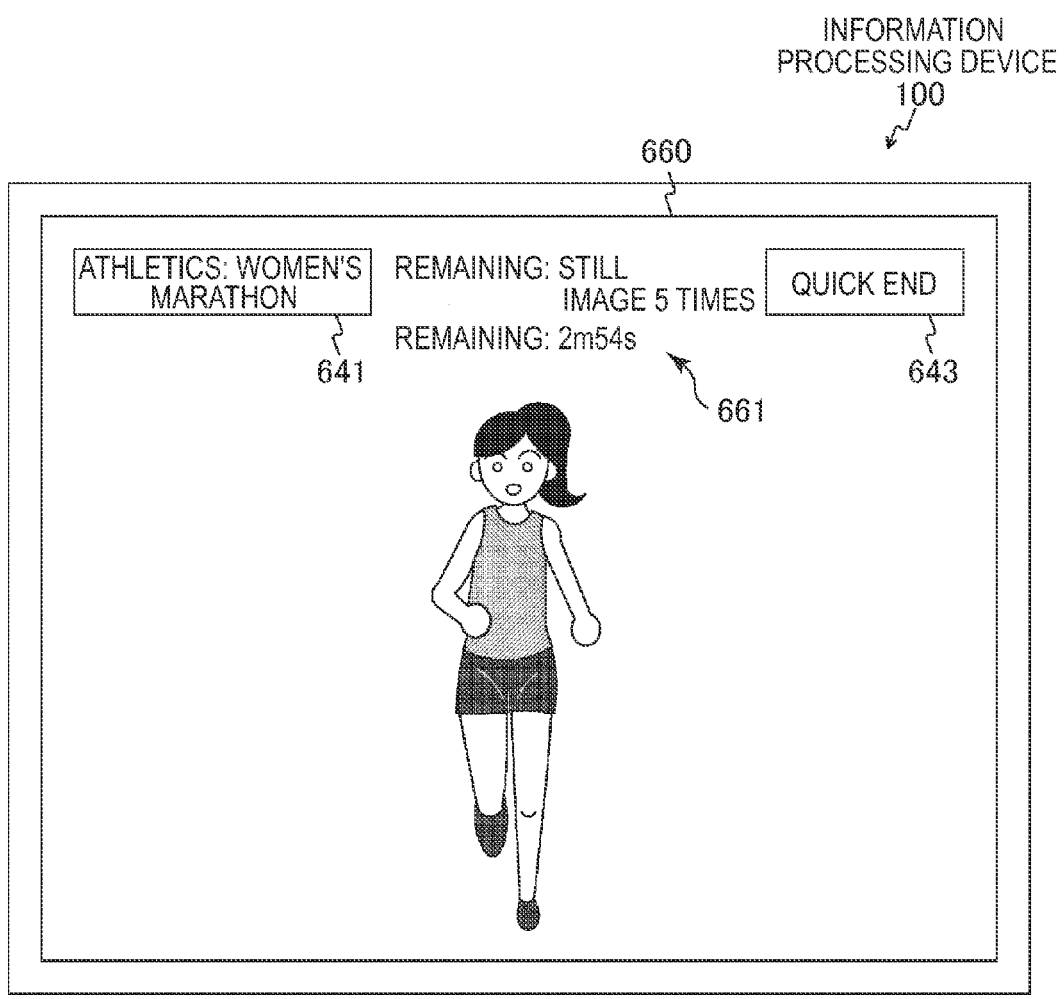
FIG. 16 is a diagram illustrating an example of a display screen displayed in the imaging process using the information processing device 100 according to the second embodiment of the present technology.

When the information processing device 100 acquires the incidental information corresponding to the valid number of times (7 times), the remaining number of times of the valid number of times (7 times) may be displayed based on the number of uses from the acquisition time. The restriction on the number of uses may be appended in a still image and the restriction on a recording time may be appended in a moving image. This example is illustrated in FIG. 16. When the number of uses reaches a predetermined number of times (for example, 5 times), the user may be notified that the number of uses reaches to the number of times the incidental information can be used (for example, display or audio is output).

In FIGS. 11a to 11c, the examples in which one of the space restriction, the time restriction, and the number-of-times restriction is appended as the use restriction have been described, but combinations of the restrictions may be appended as the use restriction. Another restriction may be appended as the use restriction or a combination of the combinations of the examples illustrated in FIGS. 11a to 11c and another restriction may be appended as the use restriction.

[Example of Display of Information Regarding Use Restriction]

Figure 12:
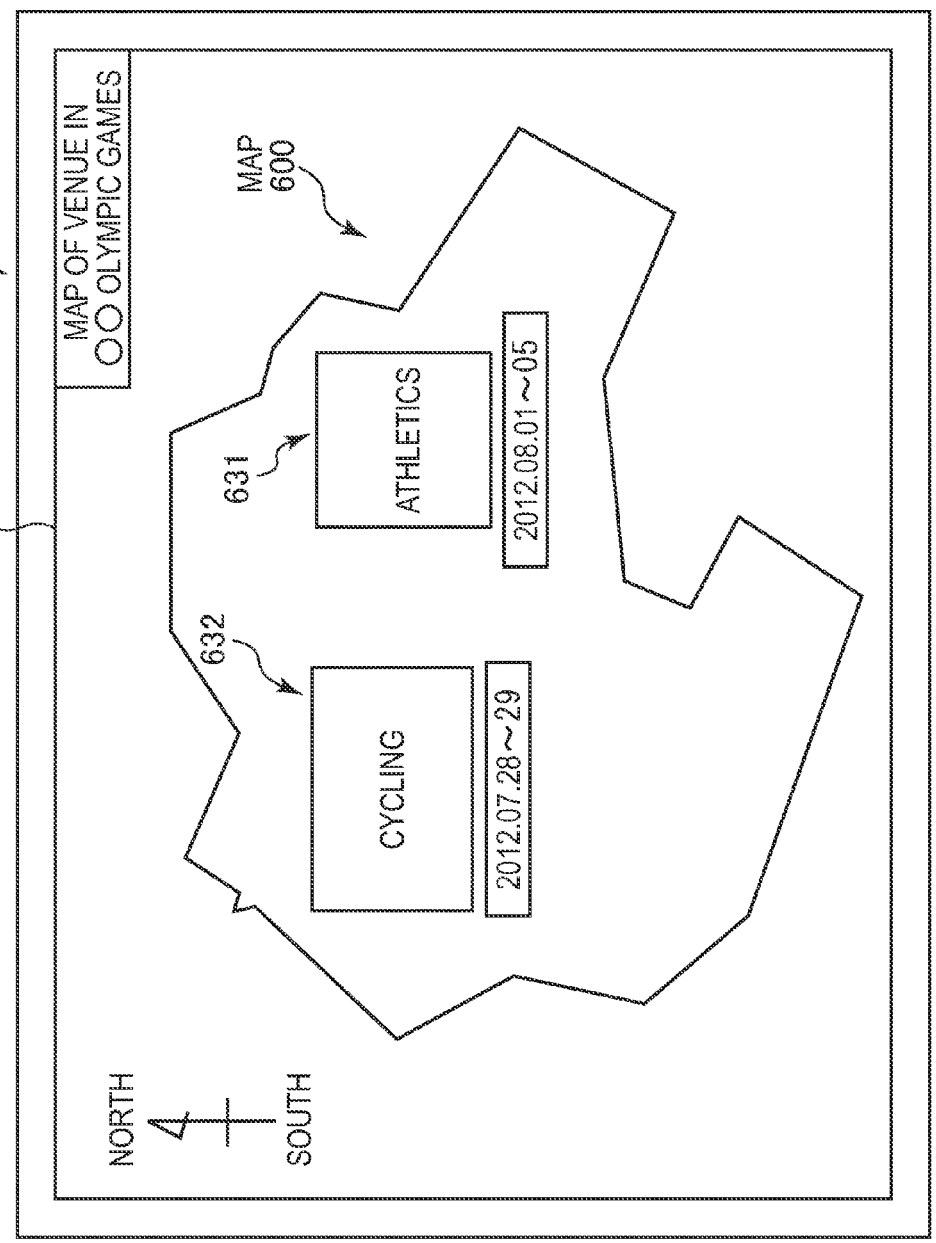
FIG. 12 is a diagram illustrating an example (incidental information display screen 630) of an incidental information display screen displayed on a display unit 160 according to the second embodiment of the present technology.

FIG. 12 is a diagram illustrating an example (the incidental information display screen 630) of an incidental information display screen displayed on a display unit 160 according to the second embodiment of the present technology. In FIG. 12, the power key 151, the reproduction key 152, and the like included in the information processing device 100 are not illustrated. In FIG. 13 and the like, the power key 151, the reproduction key 152, and the like are not illustrated either.

An incidental information display screen 630 is a screen on which various kinds of information regarding the incidental information retained in the information processing device 100 are displayed. FIG. 12 illustrates an example in which the space restriction and the time restriction are appended as the use restriction corresponding to the incidental information retained in the information processing device 100. FIG. 12 illustrates a display example when the incidental information regarding various kinds of events in the OO Olympic Games is acquired by the information processing device 100.

Specifically, a map 600 of Δ nation hosting the OO Olympic Games is displayed on the incidental information display screen 630, and various kinds of information (display information 631 and display information 632) regarding the incidental information retained in the information processing device 100 are displayed on the map 600.

For example, the display information 631 is information indicating the incidental information regarding athletics in the OO Olympic Games. For example, a rectangle corresponding to a range (the valid range corresponding to the incidental information) of a place in which athletic events are held is displayed and a period (the valid period corresponding to the incidental information) in which the athletic events are held are displayed.

For example, the display information 632 is information indicating the incidental information regarding cycling in the OO Olympic Games. For example, a rectangle corresponding to a range (the valid range corresponding to the incidental information) of a place in which the cycling events are held is displayed and a period (the valid period corresponding to the incidental information) in which the cycling events are held are displayed. Thus, by acquiring the plurality of pieces of incidental information (for example, the incidental information regarding athletics and cycling) in advance, the incidental information can be automatically associated with content within the valid period when the valid period of each piece of incidental information arrives.

In this example, the example in which the valid range corresponding to the incidental information is indicated by the rectangle has been described. When a valid range other than the rectangle is set, a display form corresponding to the set valid range can be realized.

[Example of Display of Information Regarding Use Restriction]

FIGS. 13 to 19 are diagrams illustrating examples of display screens displayed in the imaging process using the information processing device 100 according to the second embodiment of the present technology.

An image (so-called through image) generated by the imaging unit 210 is assumed to be displayed on each display screen illustrated in FIGS. 13 to 19.

FIG. 13 illustrates a display example when the incidental information in which the space restriction and the time restriction are appended as the use restriction is retained in the information processing device 100. For example, a case in which an imaging process is performed by the information processing device 100 using the incidental information acquired in a swimming venue in the OO Olympic Games is assumed.

A subject (for example, a swimmer) to be imaged by a user is displayed as a through image on a display screen 640 illustrated in FIG. 13. Incidental information display regions 641 and 642 and a quick end button 643 are displayed on the through image.

The incidental information display region 641 is, for example, a region in which the incidental information retained in the information processing device 100 is displayed. For example, in the incidental information display region 641, various kinds of events in the OO Olympic Games are displayed as the incidental information retained in the information processing device 100.

The incidental information display region 642 is, for example, a region in which the use restriction appended to the incidental information retained in the information processing device 100 is displayed. For example, a value relevant to the time restriction appended to the incidental information retained in the information processing device 100 is displayed in the incidental information display region 642. For example, a remaining time until the deadline is displayed in the incidental information display region 642 and "END" is displayed when the deadline arrives.

The quick end button 643 is a button that is pressed down when the incidental information retained in the information processing device 100 is deleted. That is, the incidental information retained in the information processing device 100 can be deleted easily through a user's operation.

FIG. 14 illustrates a display example when the incidental information to which the space restriction and the time restriction are appended as the use restriction is retained in the information processing device 100. For example, a case in which an imaging process is performed by the information processing device 100 using the incidental information acquired in an athletic venue in the OO Olympic Games is assumed.

A display screen 650 illustrated in FIG. 14 is a screen modified partially from the display screen 640 illustrated in FIG. 13 and is different in that a valid range notification region 651 is displayed on the through image. Therefore, the same reference numerals are given to portions common to those of the display screen 640 illustrated in FIG. 13 and the description thereof will be omitted.

The valid range notification region 651 is a region displayed when the current position of the information processing device 100 leaves the valid range corresponding to the incidental information retained in the information processing device 100. For example, the fact that the current position of the information processing device 100 is about to leave the valid range and a movement distance until the current position leaves the valid range are displayed in the valid range notification region 651.

The current position of the information processing device 100 is acquired by the position information acquisition unit 181. The movement distance until the current position leaves the valid range is calculated by the control unit 170 based on a relation between the valid range corresponding to the incidental information retained in the information processing device 100 and the current position of the information processing device 100. For example, the shortest distance between the boundary of the valid range corresponding to the incidental information and the current position of the information processing device 100 can be calculated as the movement distance until the current position leaves the valid range. The movement distance until the current position leaves the valid range may be calculated at intervals of a predetermined time or may be calculated at intervals of a predetermined distance. A time until the current position leaves the valid range may be calculated and displayed based on a movement speed (for example, acquired by GPS) of the information processing device 100 and the movement distance until the current position leaves the valid range. For example, "If you keep moving at this pace you will leave the valid range. 3 minutes and 15 seconds remain until you leave the valid range," can be displayed. The movement distance until the current position leaves the valid range and the time until the current position leaves the valid range may be displayed simultaneously, or only one thereof may be displayed. Simultaneous display or one display may be selected through a user's operation.

A valid range notification region 652 illustrated in FIG. 15 may be provided to two-dimensionally notify the user of the movement distance until the current position leaves the valid range.

FIG. 15 illustrates a display example when the incidental information to which the space restriction and the time restriction are appended as the use restriction is retained in the information processing device 100. A display screen 655 illustrated in FIG. 15 is a screen modified partially from the display screen 650 illustrated in FIG. 14 and is different in that the valid range notification region 652 is displayed on the through image. Therefore, the same reference numerals are given to portions common to those of the display screen 650 illustrated in FIG. 14 and the description thereof will be omitted.

The valid range notification region 652 is a region displayed when the current position of the information processing device 100 leaves the valid range corresponding to the incidental information retained in the information processing device 100. For example, a relation between the current position of the information processing device 100 and the valid range corresponding to the incidental information retained in the information processing device 100 is two-dimensionally displayed in valid range notification region 652. That is, the current position of the information processing device 100 within the valid range corresponding to the incidental information retained in the information processing device 100 is displayed by a white circle 653 in the valid range notification region 652. In the valid range notification region 652, the current position of the information processing device 100 may be displayed even when the current position of the information processing device 100 has not left the valid range corresponding to the incidental information retained in the information processing device 100.

FIG. 16 illustrates a display example when the incidental information in which the restriction on the number of uses is appended as the use restriction is retained in the information processing device 100. For example, a case in which an imaging process is performed using the incidental information acquired in the athletic venue in the OO Olympic Games by the information processing device 100 is assumed.

A display screen 660 illustrated in FIG. 16 is a screen modified partially from the display screen 640 illustrated in FIG. 13 and is different in that an incidental information display region 661 is displayed instead of the incidental information display region 642. Therefore, the same reference numerals are given to portions common to those of the display screen 640 illustrated in FIG. 13 and the description thereof will be omitted.

For example, the incidental information display region 661 is a region in which the use restriction appended to the incidental information retained in the information processing device 100 is displayed. For example, the restriction on the number of uses appended to the incidental information retained in the information processing device 100 is displayed in the incidental information display region 661. However, FIG. 16 illustrates the example in which a usable time of a moving image is displayed together with the number of times a still image is used.

Here, for example, a case in which the information processing device 100 acquires new incidental information through a user's manual operation or automatically (automatically acquired using wireless communication) is assumed. In this case, the user can be caused to select continuous use of the currently retained incidental information or use start of the newly acquired incidental information. This example is illustrated in FIG. 17.

Figure 17:
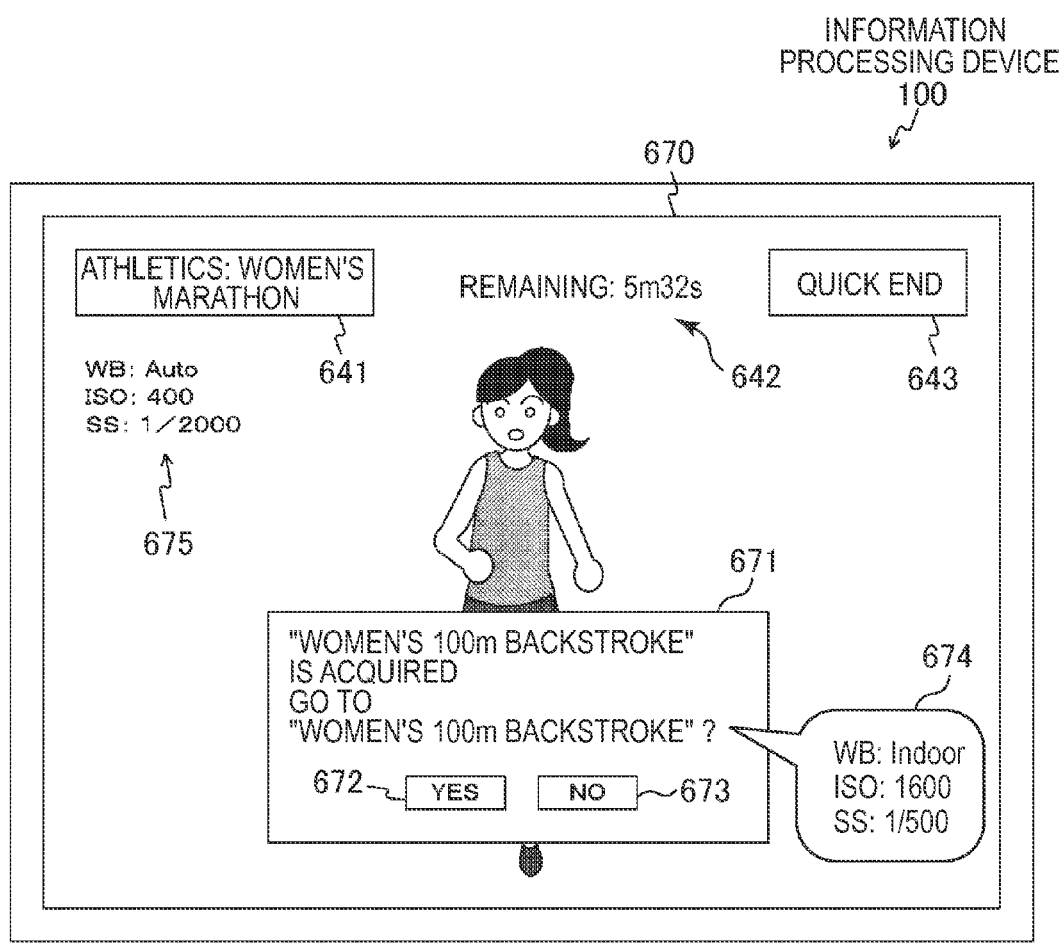
FIG. 17 is a diagram illustrating an example of a display screen displayed in the imaging process using the information processing device 100 according to the second embodiment of the present technology.

FIG. 17 illustrates a display example when the incidental information to which the time restriction is appended as the use restriction is retained in the information processing device 100 and new incidental information is acquired. For example, when an imaging process is performed using incidental information acquired in the athletic venue in the OO Olympic Games by the information processing device 100, a case in which the incidental information regarding the nearby swimming venue is acquired is assumed.

A display screen 670 illustrated in FIG. 17 is a screen modified partially from the display screen 640 illustrated in FIG. 13 and is different in that an incidental information acquisition notification region 671 and an imaging condition display region 675 are displayed. Therefore, the same reference numerals are given to portions common to those of the display screen 640 illustrated in FIG. 13 and the description thereof will be omitted.

The imaging condition display region 675 is a region in which an imaging condition (imaging parameter) corresponding to the currently retained incidental information is displayed. For example, in the imaging condition display region 675, the imaging condition (imaging parameter) is displayed so that the user can easily comprehend the set imaging condition (imaging parameter). For example, changeable settings or unchangeable settings may be displayed in another display form.

For example, when the incidental information acquisition notification region 671 is a region in which the user is notified that the new incidental information is acquired, new incidental information is acquired by the information processing device 100. For example, the fact that the new incidental information is acquired, the details of the new incidental information, a YES button 672, a NO button 673, and an imaging condition display region 674 are displayed in the incidental information acquisition notification region 671.

The imaging condition display region 674 is a region in which the imaging condition set in the new incidental information is displayed. The imaging condition is displayed in the imaging condition display region 674 only when the imaging condition is included in the new incidental information.

Here, the imaging condition can be set according to a scene (for example, a concert, a sports game) corresponding to the incidental information. For example, in a case of the incidental information regarding a concert in which voices may not be output from audience seats, an imaging condition can be set to prohibit the imaging. For example, the imaging condition can be set such that the incidental information is acquired, and then photographing and recording are not allowed after elapse of a predetermined time.

A plurality of settings/options may be displayed according to the performance of an information processing device (for example, an imaging device) and a user may be caused to select an imaging condition.

The YES button 672 is a button that is pressed down when the newly acquired incidental information displayed in the incidental information acquisition notification region 671 is set.

The NO button 673 is a button that is pressed down when the newly acquired incidental information displayed in the incidental information acquisition notification region 671 is not set and the currently retained incidental information is continuously used.

Thus, by displaying the incidental information acquisition notification region 671, it is possible to prompt the user to perform an operation of selecting the YES button 672 or the NO button 673. When the YES button 672 is pressed down, the newly acquired incidental information is set. On the other hand, when the NO button 673 is pressed down, the currently retained incidental information is continuously used until the use of the currently retained incidental information is restricted. When the use of the incidental information is restricted, the newly acquired incidental information is set. When one piece of incidental information is already set and other incidental information can also be set, a region configured to set the other incidental information may be displayed. This example is illustrated in FIG. 18.

Figure 18:
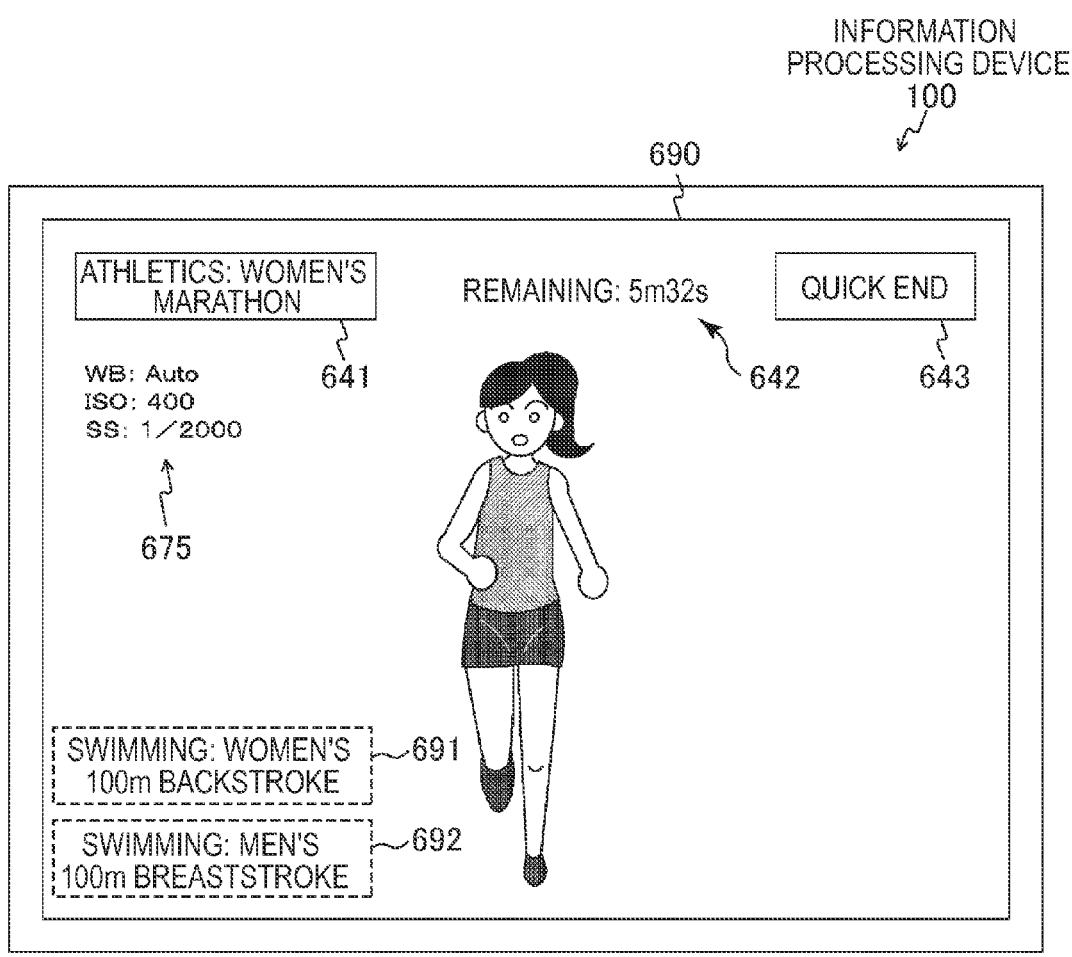
FIG. 18 is a diagram illustrating an example of a display screen displayed in the imaging process using the information processing device 100 according to the second embodiment of the present technology.

FIG. 18 illustrates a display example when a plurality of pieces of incidental information in which the time restriction is appended as the use restriction are retained in the information processing device 100 and other incidental information is configured to be settable. In the display screen 690 illustrated in FIG. 18, incidental information setting buttons 691 and 692 are provided instead of the incidental information acquisition notification region 671 in the display screen 670 illustrated in FIG. 17. Therefore, the same reference numerals are given to portions common to those of the display screen 670 illustrated in FIG. 17 and the description thereof will be omitted.

For example, the plurality of pieces of incidental information are retained in the information processing device 100, the incidental information setting buttons 691 and 692 are display regions in which the incidental information is displayed and are buttons which are used to set incidental information other than the currently set incidental information. For example, when one of the incidental information setting buttons 691 and 692 is pressed down, the incidental information corresponding to the pressed button is newly set. In this case, only the incidental information corresponding to the pressed button may be newly set or the incidental information already set together with the incidental information corresponding to the pressed button may be simultaneously set. As illustrated in FIG. 18, the incidental information setting buttons 691 and 692 may be displayed small so as not to clutter the display. To easily comprehend the incidental information setting buttons 691 and 692, the buttons may be set in different display forms (for example, display forms with different colors).

Here, for example, when the incidental information is not retained in the information processing device 100, a case in which a plurality of new pieces of incidental information are acquired through a user's manual operation or automatically (automatically acquired using wireless communication) is assumed. In this case, the user can be caused to select one of the plurality of pieces of newly acquired incidental information. This example is illustrated in FIG. 19.

Figure 19:
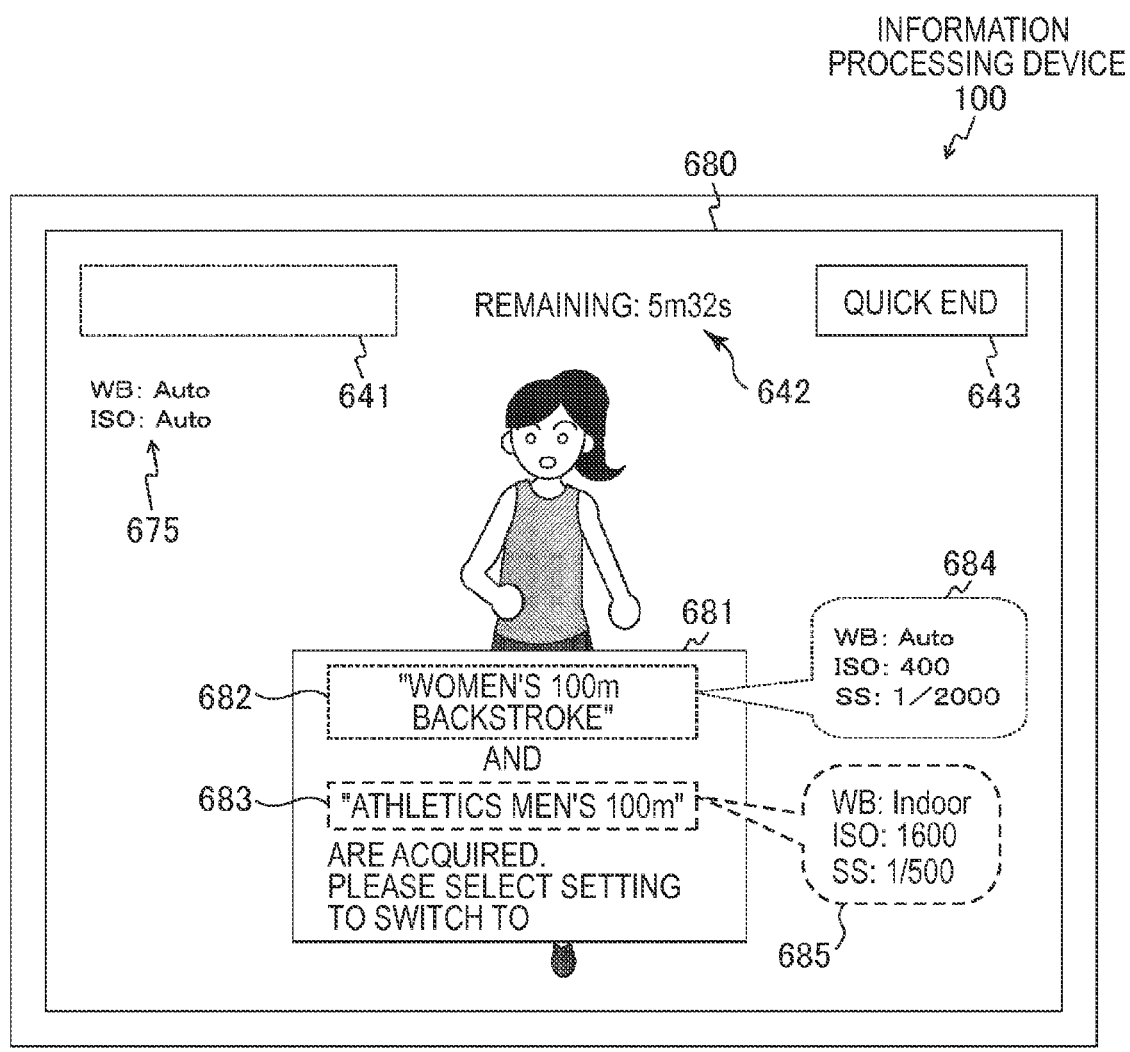
FIG. 19 is a diagram illustrating an example of a display screen displayed in the imaging process using the information processing device 100 according to the second embodiment of the present technology.

FIG. 19 illustrates a display example when the incidental information is not retained in the information processing device 100 and a plurality of pieces of new incidental information are acquired. For example, when the user arrives at a place in the OO Olympic Games, a case in which the incidental information regarding a nearby athletic venue and a nearby swimming venue is acquired is assumed.

A display screen 680 illustrated in FIG. 19 is a screen modified partially from the display screen 670 illustrated in FIG. 17 and is different in that an incidental information acquisition notification region 681 is provided instead of the incidental information acquisition notification region 671. Therefore, the same reference numerals are given to portions common to those of the display screen 670 illustrated in FIG. 17 and the description thereof will be omitted.

The incidental information acquisition notification region 681 is, for example, a region in which the user is notified that the plurality of pieces of new incidental information are acquired when the plurality of pieces of new incidental information are acquired by the information processing device 100. For example, the fact that the new incidental information is acquired, the details of the new incidental information, selection buttons 682 and 683, and imaging condition display regions 684 and 685 are displayed in the incidental information acquisition notification region 681.

The imaging condition display regions 684 and 685 are regions in which the imaging conditions set in the new incidental information are displayed. The imaging conditions are displayed in the imaging condition display regions 684 and 685 only when the imaging conditions are included in the new incidental information. By matching the display forms (for example, a color or a contour dotted line) of the imaging condition display region 684 and the selection button 682 of the incidental information corresponding to the imaging condition display region 684, the user can easily comprehend display forms. Likewise, by matching the display forms of the imaging condition display region 685 and the selection button 683 of the incidental information corresponding to the imaging condition display region 685, the user can easily comprehend display forms.

The selection buttons 682 and 683 are buttons that are pressed down when desired incidental information is set among the plurality of pieces of newly acquired incidental information displayed in the incidental information acquisition notification region 681.

Thus, by displaying the incidental information acquisition notification region 681, it is possible to prompt the user to perform a selection operation of selecting one of the selection buttons 682 and 683. When the selection button 682 is pressed down, the newly acquired incidental information (women's 100 m backstroke) is set. On the other hand, when the selection button 683 is pressed down, the newly acquired incidental information (athletics men's 100 m) is set.

In FIGS. 17 and 19, the examples in which the user is notified that the new incidental information is acquired when the new incidental information is acquired by the information processing device 100 have been described. However, a voice may be output so that the user can be notified that the new incidental information is acquired. When the user performs the selection operation, the selection may be performed by an input of a voice.

[Example of Process of Information Processing Device]

Figure 20:
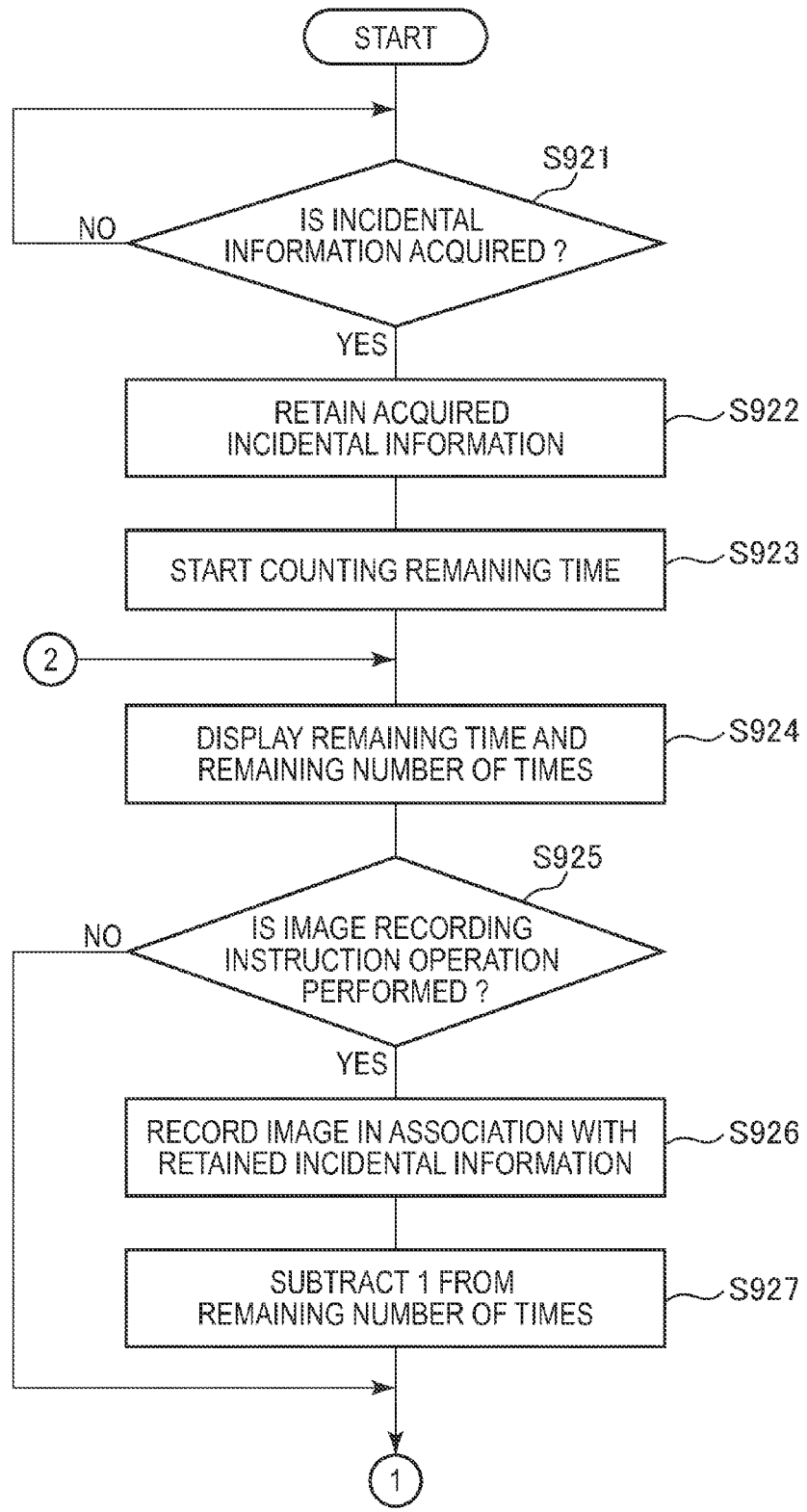
FIG. 20 is a flowchart illustrating an example of the processing procedure of an incidental information setting process performed by the information processing device 100 according to the second embodiment of the present technology.
Figure 21:
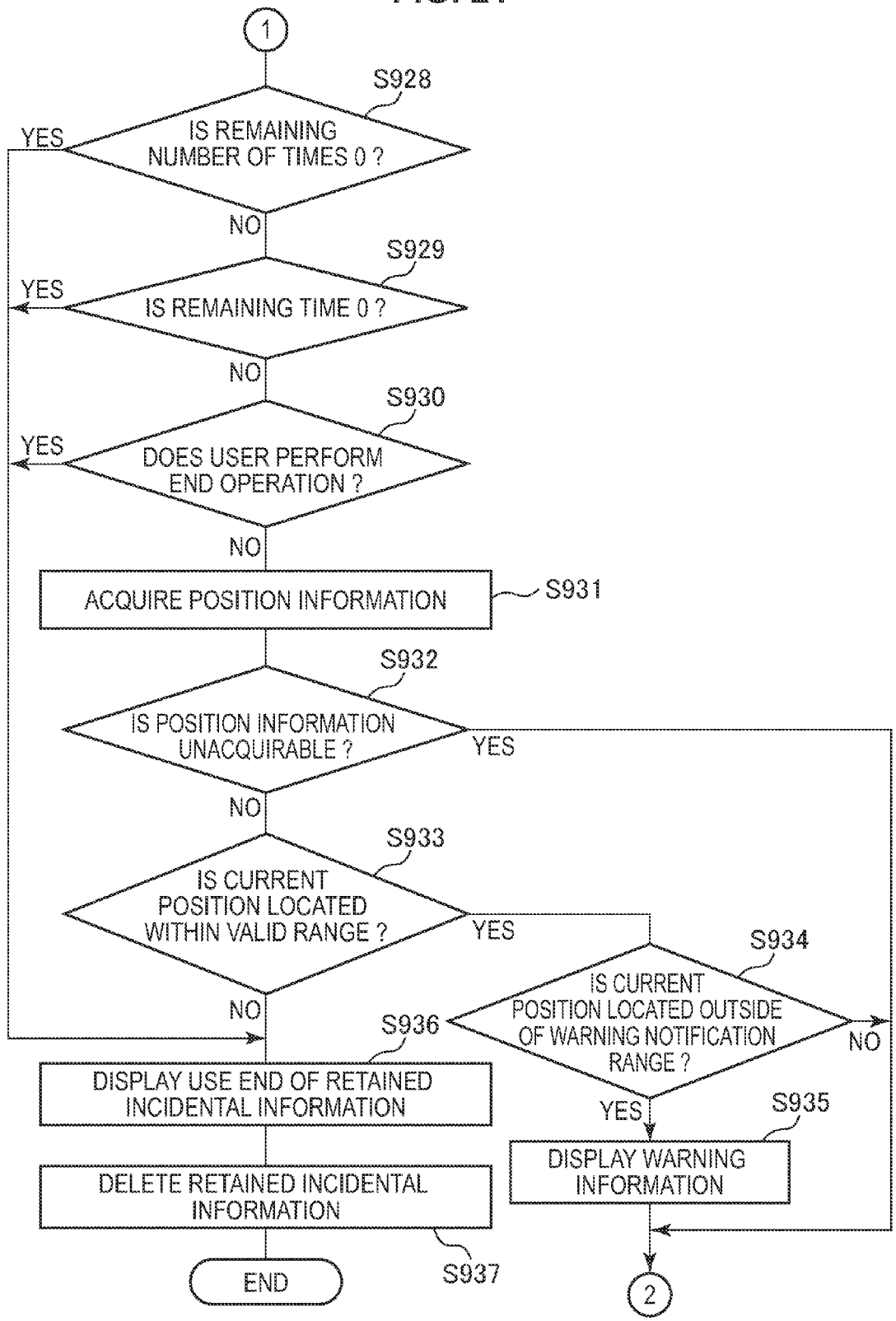
FIG. 21 is a flowchart illustrating an example of the processing procedure of the incidental information setting process performed by the information processing device 100 according to the second embodiment of the present technology.

FIGS. 20 and 21 are flowcharts illustrating an example of the processing procedure of the incidental information setting process performed by the information processing device 100 according to the second embodiment of the present technology. FIGS. 20 and 21 illustrate an example when a still image is recorded.

First, the control unit 170 determines whether the incidental information is acquired (step S921). When the incidental information is not acquired, monitoring continues. Conversely, when the incidental information is acquired (step S921), the control unit 170 retains the incidental information in the RAM 172 (step S922). Step S921 is an example of the acquiring of the incidental information described in an embodiment of the present technology.

Subsequently, the control unit 170 starts counting the remaining time relevant to the time restriction appended to the incidental information (step S923). When the time restriction is not appended to the incidental information, this step is omitted.

Subsequently, the control unit 170 causes the display unit 160 to display the remaining time relevant to the time restriction appended to the incidental information and the remaining number of times relevant to the number-of-times restriction appended to the incidental information (step S924). Use restrictions not appended to the incidental information are not displayed.

Subsequently, the control unit 170 determines whether an image recording instruction operation is performed (step S925). When the image recording instruction operation is not performed, the process proceeds to step S928. Conversely, when the image recording instruction operation is performed (step S925), the control unit 170 records the image file in which the retained incidental information is associated with the image in the recording unit 140 (step S926). Subsequently, the control unit 170 subtracts 1 from the remaining number of times relevant to the number-of-times restriction appended to the incidental information (step S927).

Subsequently, the control unit 170 determines whether the remaining number of times relevant to the number-of-times restriction appended to the incidental information is 0 (step S928). When the remaining number of times is 0, the process proceeds to step S936. Conversely, when the remaining number of times is not 0 (step S928), the control unit 170 determines whether the remaining time relevant to the time restriction appended to the incidental information is 0 (step S929). When the remaining time is 0, the process proceeds to step S936.

When the remaining time is not 0 (step S929), the control unit 170 determines whether the user performs an end operation (step S930). When the user performs the end operation, the process proceeds to step S936. Here, the user's end operation is, for example, an operation of pressing down the quick end button 643 illustrated in FIG. 13 or the like.

Subsequently, the position information acquisition unit 181 acquires position information (step S931). Here, a case in which the position information may not be acquired by the position information acquisition unit 181 for some reason is assumed. Thus, when the position information may not be acquired, the time restriction or the number-of-times restriction may be preferentially used as the use restriction. Accordingly, the control unit 170 determines whether the position information acquisition unit 181 is unable to acquire the position information (step S932). When the position information acquisition unit 181 is unable to acquire the position information, the process returns to step S924.

Conversely, when the position information acquisition unit 181 can acquire the position information (step S932), the control unit 170 determines whether the current position of the information processing device 100 is located within the valid range relevant to the space restriction appended to the incidental information (step S933). When the current position of the information processing device 100 is located within the valid range (step S933), the control unit 170 determines whether the current position of the information processing device 100 is located outside of the warning notification range relevant to the space restriction appended to the incidental information (step S934).

When the current position of the information processing device 100 is located within the warning notification range (step S934), the process returns to step S924. Conversely, when the current position of the information processing device 100 is located outside of the warning notification range (step S933), the control unit 170 causes the display unit 160 to display warning information indicating that the current position of the information processing device 100 is located outside of the warning notification range. For example, the display screens 650 and 655 illustrated in FIGS. 14 and 15 are displayed.

When the current position of the information processing device 100 is not located within the valid range (step S933), the control unit 170 causes the display unit 160 to display use end of the retained incidental information (step S936). Subsequently, the control unit 170 deletes the retained incidental information from the RAM 172 (step S937). That is, the retained incidental information is considered to be invalid. Step S923 to step S935 are an example of the control described in an embodiment of the present technology.

Thus, the control unit 170 acquires the incidental information to which at least one of the time restriction, the space restriction, and the number-of-times restriction is appended as the use restriction. When a limit value relevant to the use restriction appended to the acquired incidental information is exceeded, the control unit 170 invalidates the incidental information.

The control unit 170 performs the control of causing the display unit 160 to display information regarding the use restriction appended to the acquired incidental information. For example, when the time restriction is appended as the use restriction to the incidental information, the remaining time relevant to the time restriction is displayed on the display unit 160. For example, the display screen 640 illustrated in FIG. 13 is displayed. For example, when the space restriction is appended as the use restriction to the incidental information, a range relevant to the space restriction on a map and the position of the information processing device 100 on the map are displayed on the display unit 160. For example, the display screen 655 illustrated in FIG. 15 is displayed. For example, when the number-of-times restriction is appended as the use restriction to the incidental information, the remaining number of times relevant to the number-of-times restriction is displayed on the display unit 160. For example, the display screen 660 illustrated in FIG. 16 is displayed.

When the limit value relevant to the use restriction appended to the acquired incidental information is not exceeded and the notification threshold value relevant to the use restriction is exceeded, the control unit 170 performs the control of notifying the user that the predetermined condition is nearly satisfied. For example, the display screens 650 and 655 illustrated in FIGS. 14 and 15 are displayed.

When the plurality of pieces of incidental information are acquired, the control unit 170 causes the display unit 160 to display the display information regarding the plurality of pieces of acquired incidental information. For example, the display screens 670, 680, and 690 illustrated in FIGS. 17 to 19 are displayed. The control unit 170 associates the incidental information selected from the plurality of pieces of displayed incidental information through a user's operation with the image content.

Thus, according to the second embodiment of the present technology, for example, when content (a still image or a moving image) is recorded in an event, the incidental information corresponding to the event can be appropriately used only during a period of the event. That is, the appropriate incidental information can be associated with the content.

In the embodiments of the present technology, the example in which one piece of incidental information is set and the incidental information is associated with the content has been described. However, the plurality of pieces of incidental information may simultaneously be set and each piece of the incidental information may be associated with the content. For example, the incidental information regarding a theme park and the incidental information regarding a specific facility in the theme park may be simultaneously set and each piece of the incidental information may be associated with the content. Thus, when the content is retrieved, any one of the theme park and the specific facility in the theme park may be easily used.

In the embodiments of the present technology, the example in which the image content is used as the content has been described. However, the embodiments of the present technology can be also applied to other content such as content regarding audio. For example, the embodiments of the present technology can be applied to content generated by audio recording. In the embodiments of the present technology, the example in which the content is generated has been described. However, the embodiments of the present technology can be also applied when the existing content is edited.

In the embodiments of the present technology, the example in which the incidental information is associated with the content by recording the incidental information in the image file has been described. That is, the example in which the content is managed by Exif has been described. However, for example, when an information processing device that manages the content is managed by a metadata management file, the incidental information may be managed by Exif and the incidental information may be managed by the metadata management file. Thus, when the incidental information is managed by the metadata management file, a file name or the like can be generated using the acquired incidental information, irrespective of the Exif standard.

The above-described embodiments are examples for realizing the present technology, and portions in the embodiments and specific portions of the present technology in the claims have a correspondence relation. Likewise, the specific portions of the present technology in the claims and portions having the same names as those of the specific portions in the embodiments of the present technology have a correspondence relation. However, the present technology is not limited to the embodiments, but may be realized by modifying the embodiments in various ways within the scope of the present technology without departing from the gist of the present technology.

The processing procedures described in the above-described embodiments may be comprehended as a method having a series of orders or may be comprehended as a program causing a computer to execute the series of orders or a recording medium that stores the program. For example, a compact disc (CD), a mini disc (MD), a digital versatile disc (DVD), a memory card, or a Blu-ray Disc (registered trademark) can be used as the recording medium.

Additionally, the present technology may also be configured as below.

(1) An information processing device including:
an acquisition unit that acquires incidental information; and
a control unit that associates the incidental information with content, until a state is turned into a state in which a predetermined condition is satisfied after the acquisition of the incidental information.

(2) The information processing device according to (1),
wherein the incidental information has use restriction,
wherein the state in which the predetermined condition is satisfied is a state in which a limit value relevant to the use restriction is exceeded, and
wherein, when a state is turned into a state in which the predetermined condition is satisfied, the control unit does not associate the incidental information with the content.

(3) The information processing device according to (2), wherein the control unit performs control of causing a display unit to display information regarding the use restriction.

(4) The information processing device according to (3),
wherein the use restriction includes time restriction, and
wherein the control unit causes the display unit to display a remaining time relevant to the time restriction.

(5) The information processing device according to (3),
wherein the use restriction includes space restriction, and
wherein the control unit causes the display unit to display a range on a map relevant to the space restriction and a position of the information processing device on the map.

(6) The information processing device according to (3),
wherein the use restriction includes space restriction, and
wherein the control unit causes the display unit to display a distance from a position of the information processing device to a boundary of a range on a map relevant to the space restriction.

(7) The information processing device according to (3),
wherein the use restriction includes space restriction, and
wherein the control unit causes the display unit to display a necessary time which is taken to reach a boundary of a range on a map relevant to the space restriction and which is obtained based on a distance from a position of the information processing device to the boundary of the range and a movement speed of the information processing device.

(8) The information processing device according to (3),
wherein the use restriction includes number-of-times restriction, and
wherein the control unit causes the display unit to display a remaining value relevant to the number-of-times restriction.

(9) The information processing device according to (8),
wherein the content is image data,
wherein, when the image data is still image data, the number-of-times restriction is a number of acquisitions, and
wherein, when the image data is moving image data, the number-of-times restriction is a length of the moving image data.

(10) The information processing device according to any one of (2) to (9), wherein, when the limit value relevant to the use restriction is not exceeded and a notification threshold value relevant to the use restriction is exceeded, the control unit performs control of causing the display unit to display a fact that a state is near to the state in which the predetermined condition is satisfied.

(11) The information processing device according to any one of (1) to (10), wherein, when the acquisition unit acquires a plurality of pieces of the incidental information, the control unit causes the display unit to display information regarding the plurality of pieces of acquired incidental information and associates incidental information selected from the plurality of pieces of displayed incidental information through a user's operation with the content.

(12) The information processing device according to any one of (1) to (11), further including:
a content generation unit that generates the content,
wherein the acquisition unit acquires the incidental information including information regarding a generation place of the content.

(13) The information processing device according to (12), wherein the acquisition unit acquires, as the information regarding the generation place of the content, the incidental information that includes at least one of time information regarding an event occurring in the generation place, position information regarding the event, and character information regarding the event.

(14) The information processing device according to any one of (1) to (13), wherein the acquisition unit generates the incidental information based on multi-dimensional code information acquired by an imaging unit.

(15) The information processing device according to any one of (1) to (13), wherein the acquisition unit acquires the incidental information using wireless communication.

(16) The information processing device according to any one of (1) to (15), wherein the control unit performs control of transmitting the content with which the incidental information is associated to another information processing device via a predetermined network.

(17) An information processing method including:
  acquiring incidental information; and
  performing control of associating the incidental information with content, until a state is turned into a state in which a predetermined condition is satisfied after the acquisition of the incidental information.

(18) A program for causing a computer to execute:
  acquiring incidental information; and
  performing control of associating the incidental information with content, until a state is turned into a state in which a predetermined condition is satisfied after the acquisition of the incidental information.

The present disclosure contains subject matter related to that disclosed in Japanese Priority Patent Application JP 2012-126348 filed in the Japan Patent Office on Jun. 1, 2012, the entire content of which is hereby incorporated by reference.

What is claimed is:

1. An information processing device, comprising:
  an acquisition unit configured to acquire additional information to be recorded in association with a content; and
  a control unit configured to:
    associate the additional information with the content based on a determination that an attribute of the information processing device is within a valid range corresponding to the additional information;
    restrict the association of the additional information with the content based on the determination that the attribute of the information processing device is beyond the valid range,
    wherein the restriction of associating the additional information with the content is appended in the additional information; and
    notify a user based on the determination that the attribute is within the valid range but exceeds a warning notification range.

2. The information processing device according to claim 1, wherein the restriction of associating the additional information with the content is a use restriction.

3. The information processing device according to claim 2, wherein the control unit is further configured to control a display unit to display information regarding the use restriction.

4. The information processing device according to claim 3,
  wherein the use restriction includes a time restriction, and
  wherein the control unit is further configured to control the display unit to display a remaining time relevant to the time restriction.

5. The information processing device according to claim 3,
  wherein the attribute of the information processing device includes a position of the information processing device,
  wherein the use restriction includes a space restriction, and
  wherein the control unit is further configured to control the display unit to display the valid range on a map relevant to the space restriction and the position of the information processing device on the map.

6. The information processing device according to claim 3,
  wherein the attribute of the information processing device includes a position of the information processing device,
  wherein the use restriction includes a space restriction, and
  wherein the control unit is further configured to control the display unit to display a distance from the position of the information processing device to a boundary of the valid range on a map relevant to the space restriction.

7. The information processing device according to claim 3,
  wherein the attribute of the information processing device includes a position of the information processing device,
  wherein the use restriction includes a space restriction, and
  wherein the control unit is further configured to control the display unit to display a necessary time which is taken to reach a boundary of the valid range on a map relevant to the space restriction and which is obtained based on a distance from the position of the information processing device to the boundary of the valid range and a movement speed of the information processing device.

8. The information processing device according to claim 3,
  wherein the use restriction includes a number-of-times restriction, and
  wherein the control unit is further configured to control the display unit to display a remaining value relevant to the number-of-times restriction.

9. The information processing device according to claim 8,
  wherein the content is image data,
  wherein, for the image data which is still image data, the number-of-times restriction is a number of acquisitions, and
  wherein, for the image data which is moving image data, the number-of-times restriction is a length of the moving image data.

10. The information processing device according to claim 2, wherein the control unit is further configured to control a display unit to display a notification to notify the user that the attribute of the information processing device is near to a state in which the attribute is beyond the valid range.

11. The information processing device according to claim 1, wherein, based on the acquisition unit acquiring a plurality of pieces of the additional information, the control unit is further configured to control a display unit to display information regarding the plurality of pieces of acquired additional information and associates the additional information, selected from the plurality of pieces of displayed additional information through a user's operation, with the content.

12. The information processing device according to claim 1, further comprising:
a content generation unit configured to generate the content,
wherein the acquisition unit is further configured to acquire the additional information including information regarding a generation place of the content.

13. The information processing device according to claim 12, wherein the acquisition unit is further configured to acquire, as the information regarding the generation place of the content, the additional information that includes at least one of time information regarding an event occurring in the generation place, position information regarding the event, or character information regarding the event.

14. The information processing device according to claim 1, wherein the acquisition unit is further configured to generate the additional information based on multi-dimensional code information acquired by an imaging unit.

15. The information processing device according to claim 1, wherein the acquisition unit is further configured to acquire the additional information using wireless communication.

16. The information processing device according to claim 1, wherein the control unit performs control of transmitting the content with which the incidental information is associated to another information processing device via a predetermined network.

17. The information processing device according to claim 1, wherein the valid range includes at least one of a valid position range, a valid time period or a valid frequency range associated with the additional information.

18. The information processing device according to claim 1, wherein the content is one or more of a still image data, a moving image data, or an audio data.

19. The information processing device according to claim 1, wherein the restriction of associating the additional information with the content is a use restriction, wherein the use restriction is appended in the additional information.

20. An information processing method, comprising:
in an information processing device:
acquiring additional information;
associating the additional information with a content based on determining that an attribute of the information processing device is within a valid range corresponding to the additional information;
restricting the association of the additional information with the content based on determining that the attribute is beyond the valid range; and
notifying a user based on determining that the attribute is within the valid range but exceeds a warning notification range.

21. A non-transitory computer-readable storage medium having stored thereon, computer executable instructions for causing an information processing device to execute operations, the operations comprising
acquiring additional information;
associating the additional information with a content based on determining that an attribute of the information processing device is within a valid range corresponding to the additional information;
restricting the association of the additional information with the content based on determining that the attribute is beyond the valid range; and
notifying a user based on determining that the attribute is within the valid range but exceeds a warning notification range.

22. The information processing device according to claim 19, wherein the use restriction includes a time restriction, wherein the time restriction is a valid time period after which the association of the additional information with the content is restricted.

* * * * *